United States Patent
Suresh et al.

(10) Patent No.: US 7,490,112 B1
(45) Date of Patent: Feb. 10, 2009

(54) SYSTEM AND METHODS FOR SYNCHRONIZING INFORMATION AMONG DISPARATE DATASETS

(75) Inventors: Sethuraman Suresh, Santa Cruz, CA (US); Philippe Richard Kahn, Scotts Valley, CA (US); John S. Baumgarten, San Jose, CA (US)

(73) Assignee: Intellisync Corporation, San jose, CA (US)

( * ) Notice: Subject to any disclaimer, the term of this patent is extended or adjusted under 35 U.S.C. 154(b) by 1235 days.

(21) Appl. No.: 08/923,612

(22) Filed: Sep. 4, 1997

Related U.S. Application Data

(60) Provisional application No. 60/043,593, filed on Apr. 15, 1997.

(51) Int. Cl.
*G06F 17/30* (2006.01)

(52) U.S. Cl. .................. 707/201; 707/10; 707/100; 707/101

(58) Field of Classification Search .......... 707/1–4, 707/6–7, 8, 9, 10, 100, 101, 200–202, 203, 707/204, 540, 104.1, 102; 709/203–240, 709/248; 345/760–762; 714/19–20; 706/45–50; 715/508, 762–763, 968
See application file for complete search history.

(56) References Cited

U.S. PATENT DOCUMENTS

| | | | |
|---|---|---|---|
| 4,162,610 A | 7/1979 | Levine | |
| 4,866,611 A | 9/1989 | Cree | |
| 4,939,689 A | 7/1990 | Davis | |
| 5,134,564 A | 7/1992 | Dunn | |
| 5,187,787 A | 2/1993 | Skeen | |
| 5,251,291 A | 10/1993 | Malcolm | |
| 5,278,978 A | 1/1994 | Demers | |
| 5,315,709 A | 5/1994 | Alston | |
| 5,327,555 A | 7/1994 | Anderson | |
| 5,333,252 A | 7/1994 | Brewer | |
| 5,392,390 A | 2/1995 | Crozier | |
| 5,519,606 A | 5/1996 | Frid-Nielsen et al. | 705/9 |
| 5,530,853 A | 6/1996 | Schell | |

(Continued)

FOREIGN PATENT DOCUMENTS

CA 2505885 * 10/2001 ................. 17/30

OTHER PUBLICATIONS

Hewlett-Packard, Connectivity Pack for the HP 95LX User's Guide, 1991, pp. P0005691-P0005725.

(Continued)

*Primary Examiner*—Khanh B Pham
(74) *Attorney, Agent, or Firm*—Alston & Bird, LLP

(57) ABSTRACT

A synchronization system may include: A Source (outbound). An "Accessor" communicating with a device's data store. A corresponding Target Accessor is provided for inbound data. Both Accessors work in conjunction with a "Conduit," which is provided for understanding the data that is being read so that the data can be mapped to a universal schema or "unirecord" or to a target dataset. The Conduit serves to broker the services of the Source Accessor and the Target Accessor and to provide field mapping and conversion. Core synchronization functionality is provided by a Synchronizer or "Sync Core" (engine). The Synchronizer performs its specific functionality on a per record or per data item basis, such as determining which records need to be inserted, deleted, updated, or the like.

38 Claims, 7 Drawing Sheets

U.S. PATENT DOCUMENTS

| | | | | |
|---|---|---|---|---|
| 5,561,797 | A * | 10/1996 | Gilles et al. | 707/8 |
| 5,666,530 | A * | 9/1997 | Clark et al. | 707/201 |
| 5,666,553 | A | 9/1997 | Crozier | 707/540 |
| 5,684,990 | A * | 11/1997 | Boothby | 707/203 |
| 5,701,423 | A * | 12/1997 | Crozier | 715/762 |
| 5,706,509 | A | 1/1998 | Tso | |
| 5,710,922 | A * | 1/1998 | Alley et al. | 707/201 |
| 5,724,355 | A * | 3/1998 | Bruno et al. | 370/401 |
| 5,727,202 | A | 3/1998 | Kucala | |
| 5,729,735 | A * | 3/1998 | Meyering | 707/10 |
| 5,758,150 | A * | 5/1998 | Bell et al. | 707/10 |
| 5,758,337 | A | 5/1998 | Hammond | |
| 5,758,355 | A * | 5/1998 | Buchanan | 707/201 |
| 5,778,389 | A * | 7/1998 | Pruett et al. | 707/204 |
| 5,794,253 | A * | 8/1998 | Norin et al. | 707/203 |
| 5,813,013 | A | 9/1998 | Shakib | |
| 5,832,487 | A * | 11/1998 | Olds et al. | 707/10 |
| 5,845,293 | A * | 12/1998 | Veghte et al. | 707/202 |
| 5,857,201 | A | 1/1999 | Wright, Jr. et al. | |
| 5,857,501 | A | 1/1999 | Wright | |
| 5,884,323 | A * | 3/1999 | Hawkins et al. | 707/201 |
| 5,926,816 | A | 7/1999 | Bauer | |
| 5,950,198 | A * | 9/1999 | Falls et al. | 707/8 |
| 6,272,074 | B1 | 8/2001 | Winner | |
| 6,275,831 | B1 * | 8/2001 | Bodnar et al. | 707/201 |
| 6,295,541 | B1 * | 9/2001 | Bodnar et al. | 707/203 |
| 6,915,312 | B2 * | 7/2005 | Bodnar et al. | 707/203 |

OTHER PUBLICATIONS

Computer Corporation of America, CCA-1984 Distributed Management of Replicated Date, Final Report, Oct. 9, 1984, pp. SYW000412-SYW000453.
Hewlett-Packard, CPK100LX Connectivity Pack User's Guide for the HP200LX and the HP100LX, 1994, pp. ESI352089-ESI352177.
Oracle, Oracle7TM Server Distributed Systems, vol. II: Replicated Data, Release 7.3, Feb. 1996, pp. ESI009616-ESI010076.
Lotus, LotusMobile Lotus cc: Mail Mobile Release 2, Getting Started Guide, 1993, pp. ESI326581-ESI326769.
Intellilink, IntelliLink for Windows User's Guide, Version 3.0, 1993, pp. SYW000799-SYW000959.
Lotus, Lotus Organizer User' Guide, Release 1.0, 1992, pp. ESI327260-ESI327410.
Time Technology, TT Interchange, 1995, UK, pp. ESI326879-ESI326896.
Sheth, Amit P., A Tool for Integrating Conceptual Schemas and User Views, IEEE, 1988, pp. ESI327056-ESI327063.
Mannino et al., Matching Techniques in Global Schema Design, IEEE, 1984, pp. ESI327048-ESI327055.
Oracle, Oracle White Paper, Oracle7WP95 Oracle7TM Distributed Database Technology and Symmetric Replication, Apr. 1995, pp. ESI 009052-ESI009080.
Apple Computer, Inc., FileMaker 4 Setting the Data Management Standard, Owner's Manual for Apple Macintosh, 1994, pp. APP/PUMATECH0001-APP/PUMATECH0437.
Goldberg et al., Using Collaborative Filtering to Weave an Information Tapeslry, Communications of the ACM, Dec. 1992, vol. 35, No. 12, pp. ESI352338-ESI352347.
Traveling Software, Inc., PC-Link for the Casio B.O.S.S., Release 2, 1989, pp. P0005834-P0005880.
Apple Computer, Inc., NCUManual Newton Connection Utilities User's Manual, 1996, pp. APP/PUMATECH0713-APP/PUMATECH0815.
Syware, DST Guide, Database Subsetting Tool: Introduction to DST& DST Designer's Guide, 1993, pp. SYW000110-SYW000286.
Oracle, Oracle7 Server SQL Reference Manual, Release 7.3, Feb. 1996, pp. ESI010077-ESI010810.
Informix, Informix Guide to SQL Tutorial Version 7.1, Dec. 1994, pp. ESI009100-ESI009615.
Sharp, OL2 Sharp Organizer Link II, Model OZ-890 Operation Manual, no specified date, pp. P0005745-P0005801.
IntelliLink, IntelliLink Brochure 1990, pp. P0005731-P0005732.
Now Software, Now Up-to-Date Version 2.0 User's Guide, 1990-92, pp. ESI353130-ESI353461.
Claris, FileMaker® Pro User's Guide, 1992, pp. ESI360607-ESI361026.
Poesio et al., Metric Constraints for Maintaining Appointments: Dates and Repeated Activities, no specified date; pp. ESI353550-ESI353557.
Expert Report of John P. J. Kelly, Ph.D. in Case No. C02-1916 DLJ, USDC, N.D. Cal., 13 pp., dated Oct. 24, 2003.
Compilation of claim charts referred to in Expert Report of John P.J. Kelly, 391 pages.
Defendant and Cross-Complainant Extended Systems, Inc.'s Amended Identification of Prior Art Publications Pursuant to Patent L.R. 3-3(a) Dated Oct. 31, 2003 [No Prior Art].
*OpenIngres®/Replicator*, Replicator User Guide, Computer Associates 00-97-000-35015, 1997.
Lotus, LotusMobile Lotus cc: Mail Release 2, Getting Started Guide, 1993, pp. ESI326581-ESI326769.
Lotus, Lotus Organizer User's Guide, Release 1.0, 1992, pp. ESI327269-ESI327410.
Sheth, Amit P., A Tool for Intergrating conceptual Schemas and User Views, IEEE, 1988, pp. ESI327056-ESI327063.
Oracle7™ Server Distributed Systems, vol. II: Replicated Data, Release 7.3, Feb. 1996, 21 pages.
Now Up-to-Date Version 2.0 User's Guide, 1990-1992, 347 pages.
FileMaker 4 Setting the Data Management Standard Owner's Manual for Apple Macintosh, 1994.
FileMaker® Pro User's Guide 1992.
IntelliLink 1990, 1990, 2 pages.

\* cited by examiner

SYSTEM AND METHODS FOR SYNCHRONIZING INFORMATION AMONG DISPARATE DATASETS

The present application claims the benefit of priority from commonly-owned provisional application Ser. No. 60/043,593, filed Apr. 15, 1997, entitled METHODS FOR SYNCHRONIZATION IN A DATA PROCESSING ENVIRONMENT, the disclosure of which is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to management of information or datasets stored on electronic devices and, more particularly, to a system implementing methods for maintaining synchronization of disparate datasets among a variety of such devices.

With each passing day, there is ever increasing interest in providing synchronization solutions for connected information appliances. Here, the general environment includes "appliances" in the form of electronic devices such as cellular phones, pagers, hand-held devices (e.g., Palm Pilot™ and Windows™ CE devices), as well as desktop computers and the emerging "NC" device (i.e., a "network computer" running, for example, a Java virtual machine or a browser).

A problem facing such an environment today is that these devices do not communicate well with desktop computers, let alone with each other. In particular, a problem exists as to how one integrates disparate information—such as calendaring, scheduling, and contact information—among disparate devices. Consider, for instance, a user who has his or her appointments on a desktop PC but also has a battery-powered, hand-held device for use in the field. What the user really wants is for the information of each device to remain synchronized with all other devices in a convenient, transparent manner. Still further, the desktop PC is typically connected to a server computer, which stores information for the user. The user would of course like the information on the server computer to participate in the synchronization, so that the server also remains synchronized.

There have been various attempts to solve this problem. An earlier approach to maintaining consistency between datasets was to import or copy one dataset on top of another. This simple approach, one which overwrites a target dataset without any attempt at reconciling any differences, is inadequate for all but the simplest of applications. Expectedly, more sophisticated "synchronization" techniques were developed.

Perhaps the most common synchronization approach is one employing a "star" topology—that is, a topology where each one of the dataset writes to a common universal dataset which encompasses all of the other datasets. FIG. 1 summarizes the basic approach. In a star topology, when writing to the universal dataset or "unirecord," the only device-dependent functionality that needs to be written is that for converting information to and from the unirecord. By employing the abstraction of a unirecord, support for a new platform is typically easier to implement.

This approach of supporting the least common denominator has its disadvantages, however. Consider the task of storing menu information for every restaurant in the San Francisco Bay Area using a gigantic "universal" menu that covers every restaurant. The advantage to this approach is that one need only to develop or implement a mechanism that writes to this universal schema. The disadvantage to this, however, is that the approach can compromise the dataset. Here, if a particular item of a record cannot be represented or mapped to the universal schema, information might be lost. For instance, "rich data" (e.g., formatted or "rich" text) on one particular device mapped down to a universal representation employing simple (ASCII) text will result in loss of some content.

Another attempt is to employ synchronization using a "mesh" topology, which is illustrated in FIG. 2. Instead of using a common universal schema, the approach is to implement device-dependent drivers for mapping a dataset from one device to another, basically making sure that data is appropriately mapped between any two devices. For instance, if a user wishes to synchronize a dataset residing on a desktop PC using Starfish Sidekick® PIM (Personal Information Manager) with a dataset residing on a Palm Pilot™, the system designer must provide a specific driver supporting the Sidekick-to-Palm Pilot transfer. If a Palm Pilot™ device needs to "talk" with (i.e., reconcile its dataset with) another third party PIM, yet another driver must be provided. Thus, for n possible conduits (i.e., one-way connection between two devices), the system vendor must supply n number of drivers—one for each conduit that needs to be supported. The advantage of the approach is that any two devices can communicate natively, without relying on a universal abstraction. Since there are two conduits for every device which must communicate bidirectionally, however, the approach quickly becomes burdensome if any significant number of conduits need to be supported.

What is needed is a solution which handles all the different types of data from a variety of different devices, that is, providing support for different datasets. At the same time, the approach should be automated so that the user is provided with "one-click" convenience. The present invention fulfills this and other needs.

SUMMARY OF THE INVENTION

A synchronization system (TrueSync™) of the present invention includes the following components. At the source, a Source (outbound) "Accessor" is provided for communicating with (i.e., reading from and writing to) a device's data store, such as a source dataset. Implemented as a set of specific accessor functions, the Accessor provides open/close and read/write operations on specific dataset types (e.g., Internet Sidekick® address book), provides filtering based on field values, and maintains a Record Map (i.e., the means of identifying records to the system independent of how a record is identified within its own dataset). Actual communication with a dataset can occur through a variety of well-established means, such as through transfer of files, API (Application Programming Interface) calls, Microsoft Windows OLE (Object Linking and Embedding) mechanism, and the like. A corresponding Target Accessor is provided for inbound data, for reading from and writing to the data store of a target device, such as a target dataset.

Both Accessors work in conjunction with a "Conduit," which is provided for understanding the data that is being read so that the data can be mapped to a universal schema or "unirecord" (i.e., star topology support) or mapped directly to a target dataset (i.e., mesh topology support). Implemented as a set of specific conduit functions, the Conduit serves to broker the services of the Source Accessor and the Target Accessor and to provide field mapping and conversion.

Core synchronization functionality is provided by a Synchronizer or "Sync Core" (engine). Its many functions include: initiating synchronization or "SyncSet" (i.e., synchronization data units exchanged between datasets) transfer based on user actions or configured scheduling parameters; applying outbound and inbound synchronization methodologies; brokering the services of a specific Source Accessor (outbound), Conduit, and Transporter; maintaining a Transaction Database; and managing ongoing synchronization operations. Functioning like a database engine, the Synchronizer performs its specific functionality on a per record or per data item basis, such as determining which records need to be inserted, deleted, updated, or the like. The Synchronizer's communication with the Target Dataset occurs via the Conduit and Target Accessor. Configuration of the Synchronizer is provided by Configurator, which includes a user interface for receiving user input.

Each SyncSet itself comprises a Transfer Envelope, a Content Header, and a Content Body. The Transfer Envelope stores information about the Submitter Network, Submitter Address, Retriever Address, Return Network (if different from the Submitter's), Return Address (if different from the Submitter's), Date Queued (from Originator), Date Submitted (to Submitter), and Delivery Notification (requested or not). The Content Header stores information about the Source Dataset, Target Dataset, Date Generated, Reverse Synchronization (whether requested or not), and Processing Receipt (whether requested or not). The Content Body stores Schema Information (such as table values, if needed), Delete Orders, and Export Records.

In basic operation, the core engine issue requests to the accessors which instruct the relevant device to perform an appropriate data item or record operation, such as inserting a new record, or updating or deleting an existing record. Consider, for instance, a source dataset residing on a desktop PC in Sidekick™ format and a target dataset residing on a Palm Pilot™ device. Here, the core engine asks the accessors and conduit to provide those records that have changed since the last synchronization. Each such record is provided in the form of an extract record. Each extract record is processed according to the outbound synchronization logic and, if it has not been removed, is then mapped to a record map which provides a global identifier or ID and a timestamp. Each will now be described in further detail.

Global IDs employed at the level of the Record Map are global to the entire synchronization system. Even if a source dataset already provides unique IDs, those unique IDs are generally unique to the device or unique to particular records on that device. Global ID which are employed at the Record Map must be global across multiple devices, therefore. Accordingly, the synchronization system provides a unique global identifier (e.g., 32-bit or 64-bit value) for each data item at the level of the Record Map. Each global identifier can be based on an existing identifier, such as an existing record ID (RID) value. Alternatively, each global identifier can be synthesized de novo at runtime (e.g., based on system time/date information), particularly in those instances where the underlying dataset does not provide any identifiers for its data items. Regardless of how a global ID is provided for a given data item, that global ID is employed throughout the synchronization process for supporting synchronization across multiple devices (e.g., from palmtop to desktop to server) without creating duplicates. In conjunction with the system storing global IDs for identifying particular data items, the system also tracks when each data item or record is last modified (or created) by storing a last-modified date stamp. The actual change which occurred is logged in the Transaction Database. Internally, therefore, the identification of each record is tracked together with information about when each record was last changed, so that proper synchronization can be carried out across multiple devices.

The basic flow or propagation of a record change from one dataset to another is as follows. At the outset, the changed record is extracted and looked up in the record map. The addition of the new record is noted in the Transaction Table, so the system can determine whether the record has already been dealt with. A corresponding export record (i.e., record data along with a globally unique ID) is generated for inclusion in the synchronization set or SyncSet being created. The SyncSet contains all of the record actions that need to be transmitted to the other device, including insertions, updates, or deletions. The SyncSet can, at this point, be sent via a variety of transport mechanisms, including e-mail, FTP (file transport protocol), and two-way pagers. The receiving device processes the SyncSet by proceeding to map it, during inbound synchronization. Here, the corresponding import record is mapped into a record form for the target dataset. Once the appropriate records get inserted, updated, or deleted, the inbound Transaction Table is updated.

DETAILED DESCRIPTION OF A PREFERRED EMBODIMENT

Synchronization System and Methodologies

A. Introduction

Figure 1:
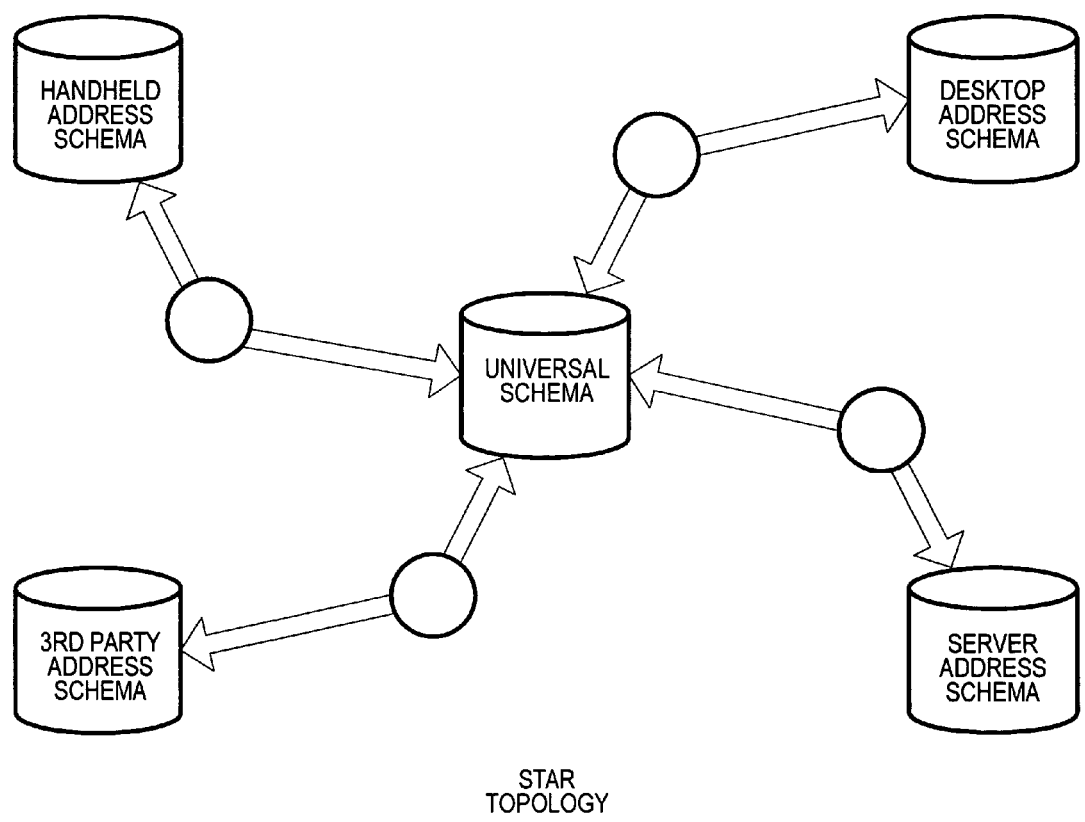
FIG. 1 is a block diagram summarizing the basic approach employed in a "star" topology.
Figure 2:
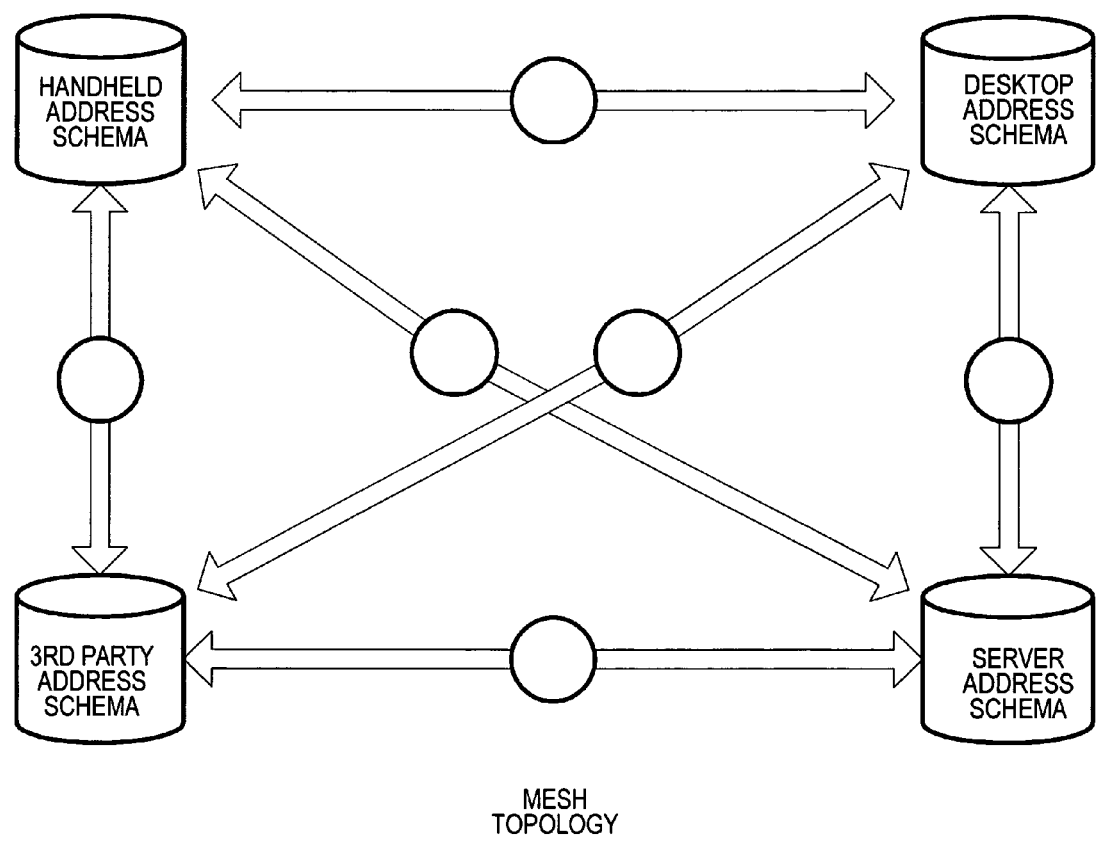
FIG. 2 is a block diagram summarizing the basic approach employed in a "mesh" topology.
Figure 3A:
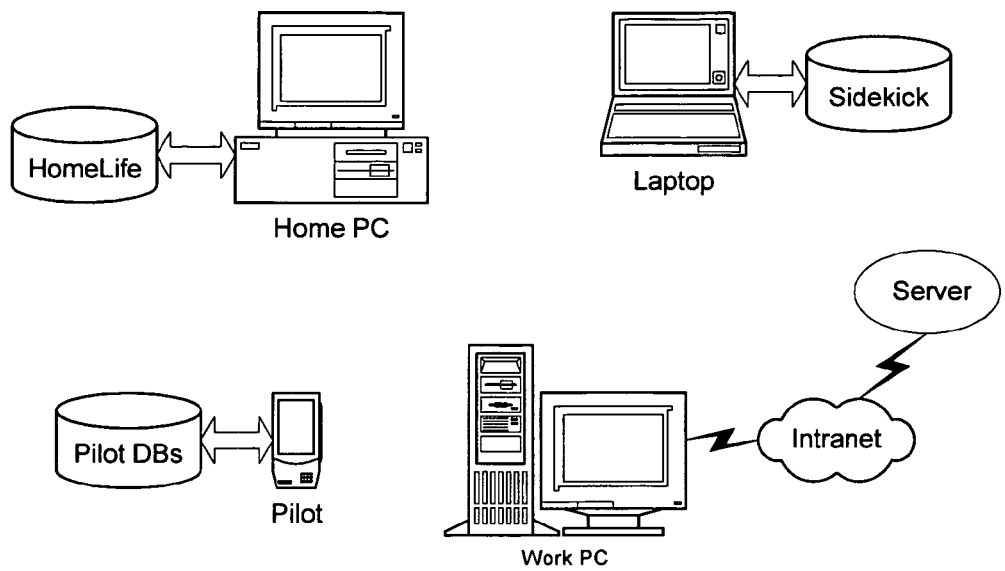
FIGS. 3A-B are diagrams illustrating a user scenario where an account executive needs to coordinate contacts and events with other employees of a corporation using different devices.

Many applications, such as personal productivity applications as Internet Sidekick® and HomeLife™, have datasets (e.g., address books and calendars). Consider for instance a user scenario, illustrated in FIG. 3A, where an account executive needs to coordinate contacts and events with other employees of the XYZ corporation. When traveling, this executive carries a laptop PC with Internet Sidekick® installed. At home, she and her husband use HomeLife™ to plan their family's activities. When on family outings, the account executive carries her Pilot organizer.

Figure 3B:
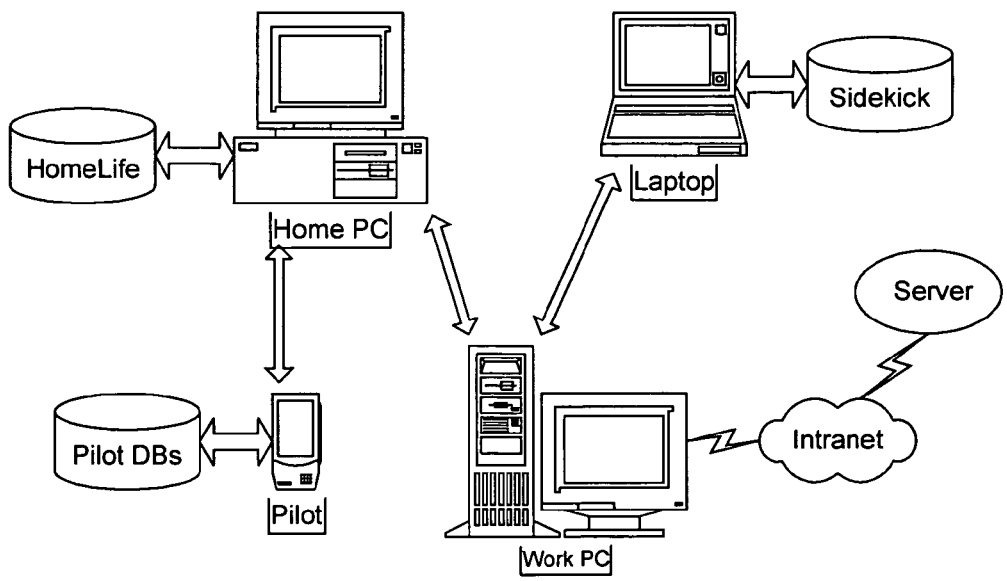

As the foregoing illustrates, a user often needs a means for synchronizing selected information from the datasets his or her applications rely upon. The account executive would not want to schedule a business meeting at the same time as a family event, for example. The synchronization system of the present invention includes methods for synchronizing the contents of these datasets, as illustrated in FIG. 3B. In particular, the system provides automated, highly configurable synchronization of one or more datasets, datasets from the same or different applications, and datasets accessible only from different PCs.

In general design, all synchronization is binary—that is, two logical datasets are synchronized at a time. Any arbitrary synchronization topology will be supported. Here, the system guarantees synchronization stability and the avoidance of undesirable side effects (cascading updates, record duplication, or the like). Datasets do not need to be directly connected but, instead, can be connected via a "store-and-forward" transport, such as electronic mail.

The synchronization system can work in conjunction with existing synchronization systems. For example, the US Robotics Palm Pilot has its own synchronization architecture. Instead of duplicating this functionality, a user includes Pilot synchronization in the network by installing, configuring and running the Pilot synchronization software against a dataset supported by the synchronization system.

B. Synchronization Design

1. Synchronization Type

There are two types of dataset synchronization: content-oriented and record-oriented. Content-oriented synchronization correlates dataset records based on the values of user-modifiable fields. Value correlation requires semantic (or at least advanced syntactic) processing that the human brain is very good at and computers are not. For example, a record in one dataset with a name field valued "Johann S. Bach" and a record in a second dataset with a name field valued "J. S. Bach" could possibly refer to the same real-world person. A human being might arrive at this conclusion by correlating associated data (addresses) or drawing upon external information (e.g., Bach is an unusual name in the U.S.). Writing code with the ability to make these type of decisions is computationally very expensive.

Record-oriented synchronization correlates dataset records by assuming that each record can be uniquely identified throughout its lifetime. This unique identifier is usually implemented as a non-modifiable, hidden field containing a "Record ID". Record-oriented synchronization algorithms usually require maintaining a mapping from one set of record IDs to another. In a preferred embodiment, the system employs record-oriented synchronization.

Record-oriented synchronization is conceptually simple and may be summarized as follows. In the rules below, A and B refer to two datasets which have a synchronization relationship. The rules are assumed to be symmetrical.

1. A and B must track similar types of data (e.g., if A is an address book, then B must be an address book).
2. A record entered in A, will create a record in B.
3. A record modified in A, will modify the corresponding record in B.
4. If record A1 has been modified in A and the corresponding record B1 has been modified in B, the record with the latest timestamp takes precedence.

The rules presented above reduce the occurrence of undesirable side effects with a network of synchronized datasets.

2. Timestamps

Synchronization logic in the system often needs to make processing decisions based on comparing the time at which past events occurred. For example, it is necessary to know if a record was modified before or after the last synchronization transaction. This requires recording the time of various events. A "timestamp" value in a record field is dedicated to this purpose. Typically, datasets involved in synchronization can be assumed to support timestamps. Datasets that do not have timestamps, however, can be supplied with suitable timestamps, in a conventional manner. In conjunction with the usage of timestamps to compare the relative timing of record creation or modification, the clocks on the respective devices are themselves synchronized.

3. Record Transformations

When performing synchronization, the system transforms records from one application-usage-schema set to another application-usage-schema set, such as transforming from an Internet Sidekick® cardfile for business contacts to a corresponding Palm Pilot™ dataset. Typically, there is a one-to-one relationship between records in the source and target datasets. If this is not the case, however, the component of the system that interacts with a non-conforming dataset includes logic to handle this non-conformance from the core logic.

Record transformations are a combination of field mappings and conversions from a source record to a target record. It is often the case that there are significant differences in the number, size, type and usage of fields between two datasets in a synchronization relationship. The specification of transformations is user configurable, with the system providing defaults.

4. Field Mapping Types and Field Conversion Types

In a preferred embodiment, the following types of field mappings are supported.

| | |
|---|---|
| 1. Null | Source field has no equivalent field in the target dataset and is ignored during synchronization. |
| 2. One-to-One | Map exactly one field in the target to one field in the source. |
| 3. One-to-Many | Map one field in the target to many fields in the source, such as parse a single address line to fields for number, direction, street, suite/apartment, or the like. |
| 4. Many-to-One | Map several fields in the target to one field in the source, such as reverse the address line mapping above. |

The following types of field conversions are supported.

| | |
|---|---|
| 1. Size | Source field may be larger or smaller in size than the target field. |
| 2. Type | Data types may be different, such as float/integer, character vs. numeric dates, or the like. |
| 3. Discrete Values | A field's values may be limited to a known set. These sets may be different from target to source and may be user defined. |

C. Synchronization Support Components

The system provides synchronization support services including Configuration Management, Scheduling Management, Transaction Management, and Application Communication. Each will be described in turn.

Configuration Management provides a management component that records the synchronization configuration. The component tracks datasets; means of access; owning application; synchronization relationships; security and privileges; SyncSet transfer (for datasets connected with a "store-and-forward" transport); and synchronization resources (size and location of supplemental datasets, and the like).

Scheduling Management provides a management component that schedules synchronization activity. This component determines whether synchronization is scheduled or performed only upon demand; whether the user is prompted before the start of synchronization and notified upon completion; and scheduling of SyncSet sending and receiving (for "store-and-forward" transport).

Transaction Management provides a management component that informs the user of the progress of synchronization. Notification responsibilities include notification of when synchronization activities are completed, current synchronization activity and activity progress, remaining activities. Other responsibilities include logging transactions, including error messages, and informing the user how to abort the current transaction.

An Application Communication component is provided to maintain a relationship between itself and the applications that "own" the datasets involved in synchronization. This relationship may be quite involved. The component addresses issues about whether data can be accessed by the system while the "owner" is running; whether the "owner" saves changes as they are made (or whether it requires prompting); and whether there are times when synchronization is prohibited.

D. Functional View

Figure 4:
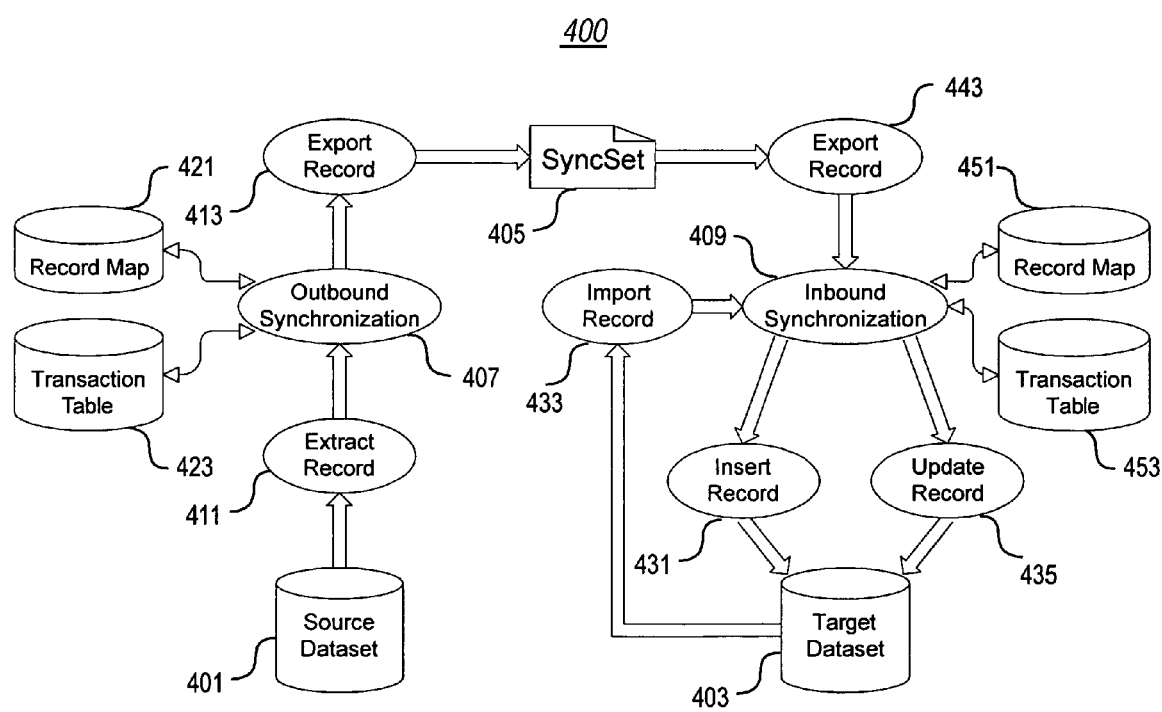
FIG. 4 is a block diagram providing a functional view of the synchronization system of the present invention.

To better understand the synchronization system and methods of the present invention, it is helpful to examine overall system operation from a functional view 400, as shown in FIG. 4. During synchronization, a dataset plays the role of both the Source and the Target Dataset. During the phase of synchronization when changes are extracted from the dataset, it plays the role of a Source Dataset 401, storing one or more Source Records. During the phase of synchronization when changes are inserted into the dataset, it plays the role of a Target Dataset 403, storing one or more Target Records. SyncSets, such as SyncSet 405, are the synchronization data units exchanged between datasets. Data that is flowing away from a Source Dataset is characterized as "outbound," as shown at 407. Data that is flowing towards a Target Dataset is characterized as "inbound," as shown at 409. When a Source Record that has been involved in synchronization is deleted, the Target Dataset must be notified. Delete Order is a notification unit that provides this notification. Extract Record 411, which is a Source Record that is read (extracted) into memory, is called an Extract Record. When an Extract Record passes outbound synchronization logic tests, it becomes an Export Record, such as Export Record 413. It, in turn, becomes Export Record 443, once having been included as part of the SyncSet.

Each SyncSet itself comprises a Transfer Envelope, a Content Header, and a Content Body. The Transfer Envelope stores information about the Submitter Network, Submitter Address, Retriever Address, Return Network (if different from the Submitter's), Return Address (if different from the Submitter's), Date Queued (from Originator), Date Submitted (to Submitter), and Delivery Notification (requested or not). The Content Header stores information about the Source Dataset, Target Dataset, Date Generated, Reverse Synchronization (whether requested or not), and Processing Receipt (whether requested or not). The Content Body stores Schema Information (such as table values, if needed), Delete Orders, and Export Records.

A Record Map 421 provides a means of identifying records to the synchronization system's logic, independent of how a record is identified within its own dataset. Each dataset involved in synchronization has an associated Record Map. The main purpose of the Record Map is to maintain a one-to-one mapping between an "external" record identifier and an "internal" record identifier. The following table defines the structure of a Record Map Entry.

| Field | Description |
| --- | --- |
| First Dataset ID | Identifier of dataset that first exported this record |
| First External Record ID | External identifier assigned to a record at first export |
| Last Mod Dataset ID | Identifier of dataset that last exported this record |
| Last Mod Source Timestamp | Timestamp on record in source dataset just before last export |
| Last Mod Target Timestamp | Timestamp on record in target dataset just after last import |
| Flags | For signaling deletion, export or import restriction, and the like |
| Internal Record ID | Internal identifier used in dataset |

Each Record Map Entry is created when a record is exported or imported for the first time. In this manner, the Record Map provides a means of identifying records to the synchronization system's logic, independent of how a record is identified within its own dataset. A corresponding Record Map 451 provides corresponding functionality at the target.

A Transaction Database 423, which is a collection of Transaction Tables, provides a history of which records have been exchanged between a pair of datasets. Each dataset involved in synchronization has an associated Transaction Database, with each Transaction Table corresponding to a synchronization partner dataset. The main purpose of the Transaction Table is to log the times that a particular record was exported/imported from/to the associated dataset to/from the partner dataset. The following table defines the structure of a Transaction Table Entry.

| Field | Description |
| --- | --- |
| First Dataset ID | Identifier of dataset that first exported this record |
| First External Record ID | External identifier assigned to a record at first export. |
| Export Time | Time when record was exported |
| Import Time | Time when record was imported |

A corresponding Transaction Database or Table(s) 453 provides corresponding functionality at the target.

During inbound synchronization, an Insert Record 431 is constructed, for each insertion into a Target Dataset. An Insert Record is created from the transformation of the Export Record data, supplemented by programmatic or tabular data. An Import Record 433 is a corresponding Target Record found for an Export Record (via the Record Map). An Update Record 435 is a record constructed during inbound synchronization to update a Target Record. An Update Record is created from the transformation of the Export Record data, supplemented by data from the Import Record.

E. System Components

Figure 5A:
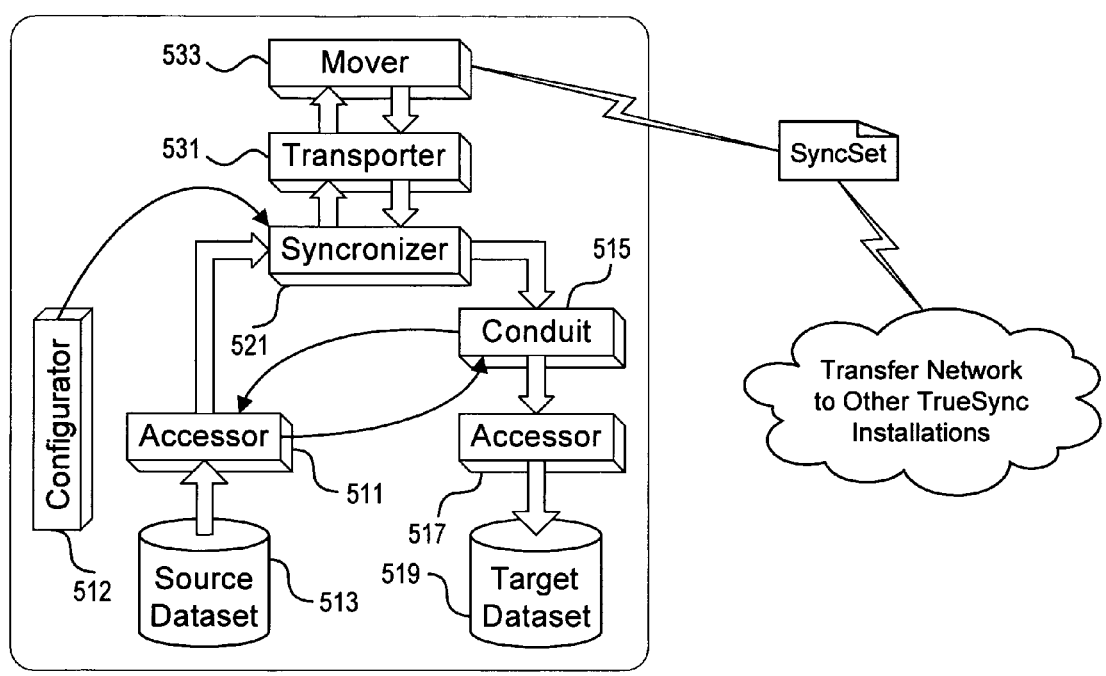
FIGS. 5A-B are block diagrams illustrating the functional components of a synchronization system of the present invention.
Figure 5B:
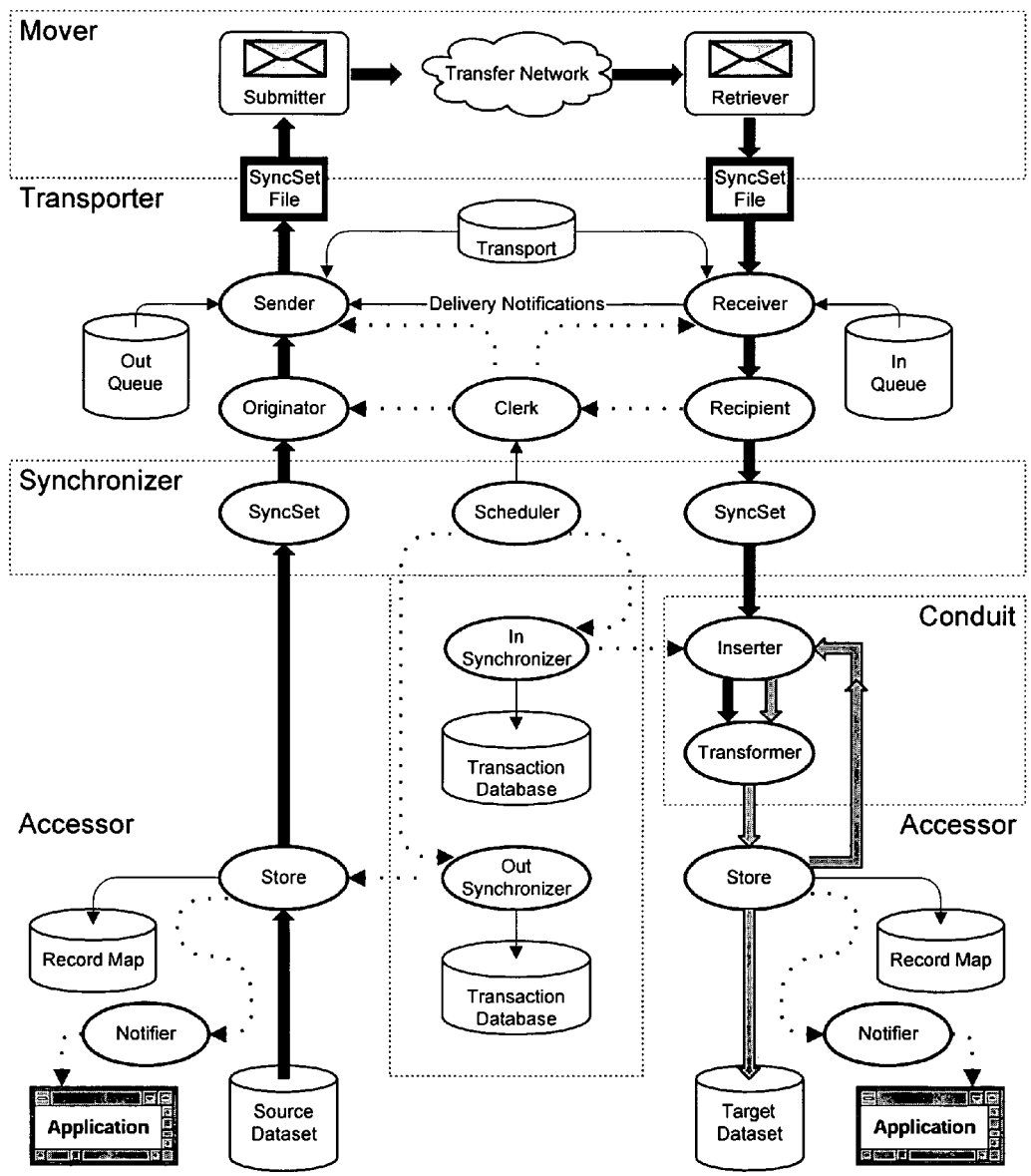

The basic functional components of a synchronization system (TrueSync™) 500 of the present invention is illustrated in FIG. 5A; a more detailed view is presented in FIG. 5B. At the source, Source (outbound) "Accessor" 511 is provided for communicating with (i.e., reading from and writing to) a device's data store, such as source dataset 513. Implemented as a set of specific accessor functions, the Accessor 511 provides open/close and read/write operations on specific dataset types (e.g., Internet Sidekick® address book), provides filtering based on field values, and maintains a Record Map (i.e., the means of identifying records to the system independent of how a record is identified within its own dataset). Actual communication with a dataset can occur through a variety of well-established means, such as through transfer of files, API (Application Programming Interface) calls, Microsoft Windows OLE (Object Linking and Embedding) mechanism, and the like. As shown, a corresponding Target Accessor 517 is provided for inbound data, for reading from and writing to the data store of a target device, such as target dataset 519.

Shown in further detail in FIG. 5B, the Accessor is responsible for all dataset operations, including the semantics of opening and closing datasets, reading and writing records, and includes the following objects: a "Store" and a "Notifier." The Store opens/closes and reads/writes records from the Source/Target Datasets. It maintains the Record Map and performs inbound/outbound filtering. The Notifier provides all necessary interfacing with the application that "owns" the Source/Target Dataset.

Both Accessors work in conjunction with a "Conduit" 515, which is provided for understanding the data that is being read so that the data can be mapped to a universal schema or "unirecord" (i.e., star topology support) or mapped directly to a target dataset (i.e., mesh topology support). Implemented as a set of specific conduit functions, the Conduit serves to broker the services of the Source Accessor 511 and the Target Accessor 517 and to provide field mapping and conversion.

Shown in further detail in FIG. 5B, the Conduit includes the following objects which are responsible for Transforming Export Records into Target Records: an "Inserter" and a "Transformer." The Inserter utilizes an Accessor to read/write the Target Dataset. It utilizes the Transformer to perform mapping and conversion. The Transformer performs all field mapping and conversions between an Export Record and either an Insert or Update Record.

Core synchronization functionality is provided by Synchronizer 521 (in FIG. 5A) or "Sync Core" (engine). Its many functions include: initiating synchronization or "SyncSet" (i.e., synchronization data units exchanged between datasets) transfer based on user actions or configured scheduling parameters; applying outbound and inbound synchronization methodologies; brokering the services of a specific Source Accessor (outbound), Conduit, and Transporter; maintaining a Transaction Database; and managing ongoing synchronization operations. Functioning like a database engine, the Synchronizer performs its specific functionality on a per record or per data item basis, such as determining which records need to be inserted, deleted, updated, or the like. As shown, the Synchronizer's communication with the Target Dataset occurs via the Conduit and Target Accessor. Configuration of the Synchronizer is provided by Configurator 512, which includes a user interface for receiving user input.

Shown in further detail in FIG. 5B, the Synchronizer includes the following objects which are responsible for scheduling and orchestrating synchronization: a Scheduler, an "OutSynchronizer," and an "InSynchronizer." The Scheduler initiates synchronization either by configuration or on demand. It utilizes the OutSynchronizer for outbound processing and an InSynchronizer for inbound processing. The OutSynchronizer loads the proper Accessor for the Source Dataset type. It executes the outbound portion of the core synchronization methodology of the present invention utilizing an interface to the Source Store, and it maintains the Transaction Database. The InSynchronizer loads the proper Conduit for the Source Dataset/Target Dataset pair. It executes the inbound portion of the synchronization methodology of the present invention utilizing an interface to an Inserter. It also maintains the Transaction Database.

The Transporter or Transport component, which is responsible for orchestrating the transfer of SyncSets between TrueSync installations, is shown in further detail in FIG. 5B. It includes the following objects: an Originator, a Recipient, a Sender, and a Receiver. The Originator receives the formatted Delete Orders and Export Records from the OutSynchronizer. The Originator prefixes this data with a content header (source and target dataset information) then passes this complete SyncSet to the Sender. The Sender adds a transfer envelope specifying delivery information and queues the SyncSet for submission. The Sender picks a Submitter appropriate for the configured Transfer Network. The Submitter injects the SyncSet into the Transfer Network. After transfer, the Retriever extracts the SyncSet from the Transfer Network and queues the SyncSet to the Receiver. The Receiver removes the transfer envelope and sends a delivery report to the Sender if requested. The Receiver then passes the SyncSet to the Recipient. The Recipient removes the content header and invokes the InSynchronizer to process the Delete Orders and Export Records. After confirmation of processing by the InSynchronizer, the Recipient returns a receipt to the Originator if requested.

Although not necessary for implementing the present invention, the synchronization system 500 in a preferred embodiment includes Mover 533 for exchanging SyncSets with other Movers at other synchronization system installations. The Mover 533 is controlled by Transporter 531, which provides inbound and outbound SyncSet queues. As shown in FIG. 5B, the Mover includes the following objects which are responsible for interacting with specific Transfer Networks: a Submitter and a Retriever. The Submitter accepts SyncSets from the Sender and submits them to a Transfer Network. The Retriever retrieves SyncSets from a Transfer Network and routes them to the Receiver.

F. Synchronization Methodology

1. Overview

In basic operation, the core engine issues requests to the accessors which instruct the relevant device to perform an appropriate data item or record operation, such as inserting a new record, or updating or deleting an existing record. Consider, for instance, a source dataset residing on a desktop PC in Sidekick™ format and a target dataset residing on a Palm Pilot™ device. Each dataset represents a type of data in an application and a specific instance of that. The core engine asks the accessors and conduit to provide those records that have changed since the last synchronization. Each such record is provided in the form of an extract record. Each extract record is processed according to the outbound synchronization logic and, if it has not been removed, is then mapped to a record map which provides a global identifier or ID and a timestamp. Each will now be described in further detail.

Global IDs employed at the level of the Record Map are global to the entire synchronization system. Even if source datasets already provide unique IDs, those unique IDs are generally unique to the device or unique to particular records on that device. Global IDs employed at the Record Map, on the other hand, must be global across multiple devices. Accordingly, the synchronization system provides a unique global identifier (e.g., 32-bit or 64-bit value) for each data item at the level of the Record Map. Each global identifier can be based on an existing identifier, such as an existing record ID (RID) value. Alternatively, each global identifier can be synthesized de novo at runtime (e.g., based on system time/date information), particularly in those instances where the underlying dataset does not provide any identifiers for its data items. Regardless of how a global ID is provided for a given data item, that global ID is employed throughout the synchronization process for supporting synchronization across multiple devices (e.g., from palmtop to desktop to server) without creating duplicates. In conjunction with the system storing global IDs for identifying particular data items, the system also tracks when each data item or record is last modified (or created) by storing a last-modified date stamp. The actual change which occurred is logged in the Transaction Database. Internally, therefore, the identification of each record is tracked together with information about when each record was last changed, so that proper synchronization can be carried out across multiple devices.

The basic flow or propagation of a record change from one dataset to another is as follows. At the outset, the changed record is extracted and looked up in the record map. The addition of the new record is noted in the Transaction Table, so the system can determine whether the record has already been dealt with. A corresponding export record (i.e., record data along with a globally unique ID) is generated for inclusion in the synchronization set or SyncSet being created. The SyncSet contains all of the record actions that need to be transmitted to the other device, including insertions, updates, or deletions. The SyncSet can, at this point, be sent via a variety of transport mechanisms, including e-mail, FTP (file transport protocol), and two-way pagers. The receiving device processes the SyncSet by proceeding to map it, during inbound synchronization. Here, the corresponding import record is mapped into a record form for the target dataset. Once the appropriate records get inserted, updated, or deleted, the inbound Transaction Table is updated.

2. Detailed Operation

Figure 6:
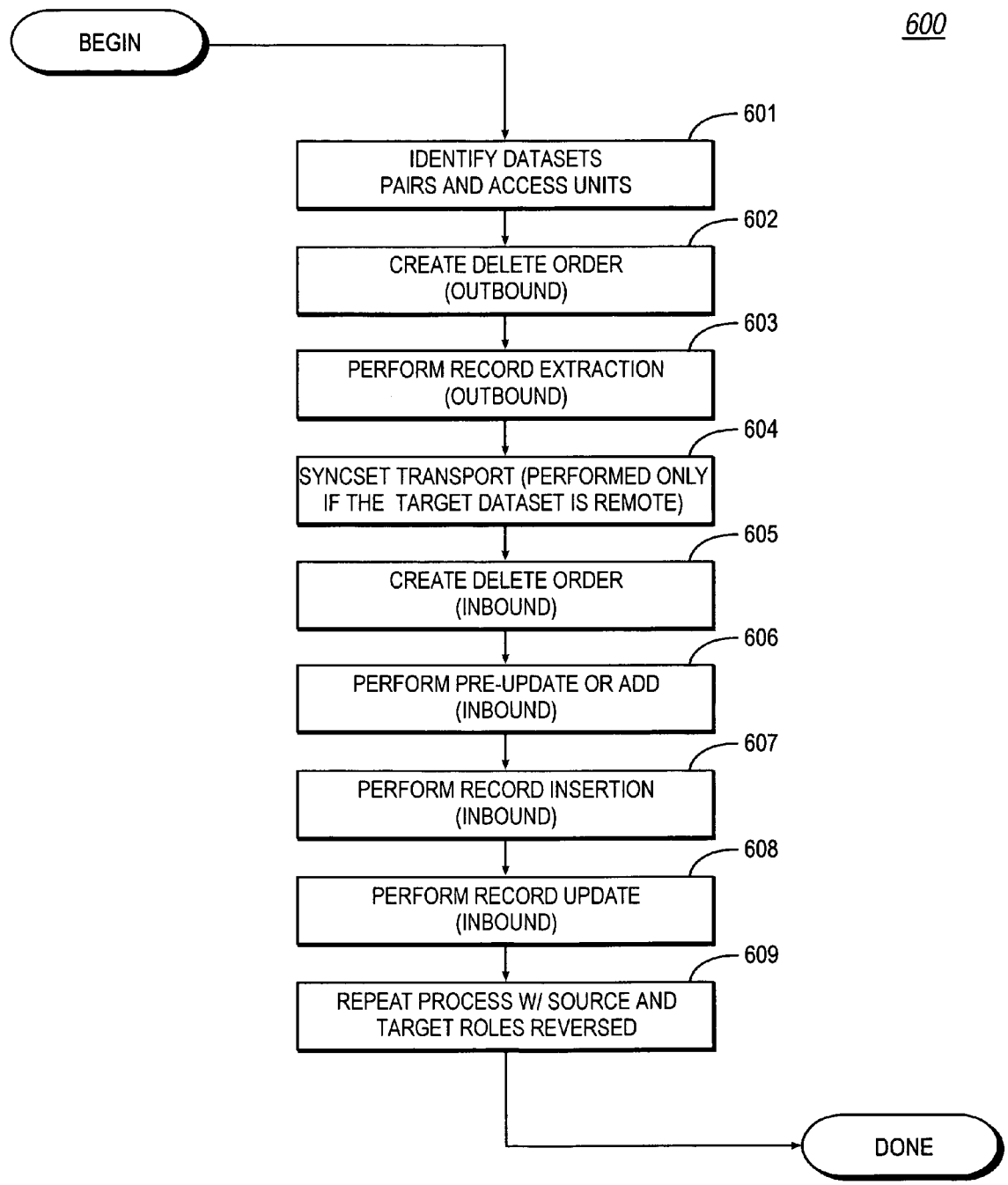
FIG. 6 is a flowchart illustrating a synchronization method of the present invention.

A synchronization method 600 of the present invention is illustrated in FIG. 6. At the outset, dataset pairs and access units are identified, as indicated by step 601. In the currently-preferred embodiment, the synchronization process is a binary operation involving two specific datasets, referred to here as #1 dataset and #2 dataset. Accordingly at this step, configuration information is read that identifies a synchronization relationship between datasets #1 and #2. Typically, at least one of these datasets, for instance #1, is local. In this case, dataset #1 initially assumes the role of the Source Dataset, and dataset #2 initially assumes the role of the Target Dataset. The current time is saved as the new "Start-Of-Last-Export" time value. The prior Start-Of-Last-Export value is retrieved. This value is used to reduce the number of records submitted to outbound processing.

At step 602, the method creates the Delete Order (outbound). Here, the method wants to determine which records have previously been sent to the target dataset and whether such records still exist in the source dataset. If a given record previously sent to the target no longer exists at the source, it is added to the Delete Order. Note particularly that this determination can be performed entirely at the source, based on information in the Transaction Table. The specific processing is as follows. Using the Global IDs stored in the Transaction Table Entries, the method searches the Record Map to find the corresponding Record Map Entry. If the Record Map Entry is flagged as DELETED, a Delete Order is created. If the Record Map Entry is not flagged as DELETED and a search for the corresponding record in the Source Dataset fails, a Delete Order is created. If a Delete Order was created, it is serialized into the SyncSet, the Record Map Entry is flagged as DELETED (if necessary) and the Transaction Table Entry is deleted. This step is repeated until the Transaction Table has been traversed.

At step 603, the method performs Record Extraction (outbound). Here, the method wants to determine which records have either modified or added to the source dataset since that dataset was last synchronized with the target dataset (e.g., determined by timestamps). If a given record is either modified or added, an outbound Extract Record is created. The specific processing is as follows. A Source Record is used to read an Extract Record into memory. The method looks up the Extract Record in the Record Map. If the record is found, corresponding status flags are checked to see if the NO_EXPORT option is set. If so, the Extract Record is skipped. The method looks up the Extract Record in the Transaction Table. If the record is found, again status flags are checked to see if the NO_EXPORT option is set. If so, the Extract Record is skipped. Also at this point, outbound filtering (e.g., rules-based filtering, table-based filtering, or flag-based filtering) is applied. If the Extract Record fails, it is skipped. If a Record Map Entry exists, the last modified fields (i.e., timestamps) are updated to reflect any modifications made to the Source Record by users. If a Record Map Entry does not exist, one is created. If a Transaction Table Entry exists, the method performs time value comparisons to avoid exporting records that have just been imported or have not changed since last synchronization. If the Extract Record fails these tests, the Extract Record is skipped. If it passes these tests, the Transaction Table Entry is updated. If no Transaction Table Entry exists, one is created. If the Extract Record has passed all previous logic tests, the Extract record is declared to be an Export Record and is, together with the Record Map Entry, serialized into the SyncSet. This step is repeated until all Source Records in the Source Dataset have been traversed.

Collectively, the Delete Order set and the Record Extraction set comprise the SyncSet. Step 604 illustrates that this SyncSet is (optionally) transported to the target. This step occurs only in the context of remote synchronization—that is, when the target dataset resides at a remote location with respect to the source dataset. The SyncSet can, at this point, be sent via a variety of well-known transport mechanisms, including e-mail (e.g., SMTP—Simple Mail Transport Protocol), TCP/IP (Transmission Control Protocol/Internet Protocol), FTP (File Transport Protocol), and two-way pagers.

Step 605 marks the inbound phase. At that step, a Delete Order (inbound) is serialized from the SyncSet. Here, the method looks up the Global ID in the Transaction Table. If the ID is found, corresponding flags are checked to see if the NO_IMPORT option is set. If so, the Delete Order is ignored. Now, the method looks up the Global ID in the Record Map. If it is not found or flagged DELETED, the Delete Order is ignored and any existing Transaction Table Entry is deleted. The Record Map Entry flags are checked at this point to see if the NO_IMPORT option is set. If so, the Delete Order is ignored. The method looks up the Target Record in the Target Dataset, to read an Import Record into memory. If the Target Record is missing, the Record Map entry is updated, any Transaction Table Entry is deleted and the Delete Order is ignored. The Record Map Entry is updated to reflect any user modification to the Target Record in the Target Dataset. If the Target Record has been modified since the Delete Order was created, then the Delete Order is ignored. Any inbound filtering is applied at this point. If the Import Record fails inbound filtering, the Delete Order is ignored. The Record Map Entry is flagged DELETED and the last modification fields are updated. The Target Record is deleted from the Target Dataset, and any Transaction Table Entry is deleted. The step is repeated for all Delete Orders in the SyncSet.

At step 606, the method performs a Pre-Update or Add (Inbound) operation. Here, the Record Map Entry and Export Record are serialized from the SyncSet. The method looks up the Global ID in the Record Map. If there is no Record Map Entry, any existing Transaction Table Entry is deleted and the method proceeds to the Add Step. If the Record Map Entry is flagged NO_IMPORT or DELETED, the Export Record is ignored. The method looks up the Global ID in the Transaction Table. Using the Internal ID, the method locates the Import Record in the Target Dataset. If the Import Record is missing, the Record Map Entry is updated, any Transaction Table Entry is deleted, and the Export Record is ignored. The Record Map Entry is updated for import to reflect any user modifications to the Target Record. If the Target Record has been modified after the Export Record was created, the Export Record is ignored. If there is no existing Transaction Table Entry, one is created. If there is an existing Transaction Table Entry which is flagged NO_IMPORT, the Export Record is ignored. The method proceeds to updating.

At step 607, the method performs a Record Insertion (inbound) operation. Here, the method creates an Insertion Record; the Export Records fields are transformed into the Insertion Record. Any inbound filtering is applied. If the Insertion Record fails, the Export Record is ignored. The Insertion Record is inserted into the Target Dataset with a current timestamp. A new Transaction Table Entry is created, and a new Record Map Entry is created.

At step 608, the method performs a Record Update (inbound) operation. Via transformation, the Import Record is updated from the Export Record. Any inbound filtering is applied. If the Import Record fails, the Export Record is ignored. The Transaction Table Entry is updated. The Target Record is updated with the Import Record and assigned a current timestamp. The last modification fields of the Record Map Entry are updated.

Finally, step 609 illustrates that the process is made bidirectional by reversing the roles of the datasets. Here, the process is repeated with dataset #2 assuming the role of the Source Dataset and dataset #1 assuming the role of the Target Dataset.

G. Source Code Implementation

The synchronization methodology of the present invention is implemented using two classes: OutSynchronizer and InSynchronizer. Each will be described in turn.

1. OutSynchronizer a. Class Definition

In an exemplary embodiment, the OutSynchronizer may be defined as follows (in the C++ programming language).

```
1:  struct OutSynchronizer
2:  {
3:      OutSynchronizer(CFile& file, InSynchronizer* pInSync =
        NULL);
4:
5:      ~OutSynchronizer( );
6:
7:      int open (ISyncInfo& outInfo, ISyncInfo& inInfo);
8:      int close(ISyncInfo& outInfo);
9:
10:     int synchronizer( );
11:
12: private:
13:
14:     typedef TransactionTable tTT; // for brevity
15:
16:     void init(InSynchronizer* pInSync);
17:
18:     int sendDeletes  ( );
19:     int extractRecords( );
20:
21:     void updateMapForMissing(MapEntryExt& entryExt,
22:         IRecordMap& map, const CTime& expTime);
23:     void updateMapForExport (MapEntryExt& entryExt,
24:         IRecordMap& map, time_t modTime);
25:
26:     int synchronizeOne( );
27:
28:     struct Stats;
29:
30:     CFile&           m_file;
31:     CArchive*        m_pArch;
32:     ISyncInfo*       m_pInfo;
33:     StatusStr*       m_pSStr;
34:     InSynchronizer*  m_pInSync;
35:
36:     BOOL             m_forceSync;
37:     IStore*          m_pStore;
38:     TransactionDB*   m_pTDB;
39:     tTT*             m_pTable;
40:     Stats*           m_pStats;
41: };
```

At the outset, the class declares (at lines 3-8) housekeeping routines, including a class constructor (line 3) and class destructor (line 5). As shown, in addition to the constructor and destructor, the class includes an open method (line 7) and close method (line 8). These methods tend to housekeeping chores attendant with opening and closing objects created from the class.

Of particular interest is the synchronize method defined at line 10. This method is where the actual synchronization process is initialized. It operates in conjunction with helper functions of the class, including for instance the sendDeletes method (line 18) and extractRecords method (line 19). These helper methods, in turn, work in conjunction with map maintenance methods, defined at lines 21-24.

Class data members supporting synchronization are defined at lines 28-40. A data member of type CFile (line 30) supports input/output operations. Similarly, a data member is defined of type CArchive (line 31) supporting the processing of specific data types. Both CFile and CArchive are data structures provided by Microsoft Foundation Classes (MFC), available from Microsoft Corporation of Redmond, Wash. At line 34, the class defines a data member which is a pointer to an InSynchronizer. This data member is employed in the instance of in-memory synchronization (i.e., record-by-record synchronization), for communicating directly with the InSynchronizer object. The m_forceSync, defined at line 36, is a boolean data member employed for "forcing" synchronization—that is, performing synchronization with timestamps ignored.

At line 37, the class defines a data member which is a pointer to IStore. This data member, therefore, provides a pointer to the IStore interface, which is employed to communicate with the accessor. At line 38, the class defines a transaction database object (i.e., a C++ object comprising a set of transaction tables). At line 39, the method defines a data member which is a specific transaction table object; it describes the specific relationship which will be employed for synchronization.

b. synchronize Method

In an exemplary embodiment, a synchronize method may be constructed as follows.

```
int OutSynchronizer::synchronize( )
{
    int ok = 1;
    if (ok) ok = sendDeletes( );
    if (ok) ok = extractRecords( );
    if (ok)
    {
        *m_pArch << PREFIX_END_SYNC;
        if (m_pInSync != NULL) ok = synchronizeOne( );
    }
    return ok;
}
```

As shown, the method serves to invoke two sub-methods: sendDeletes and extractRecords. Each of these workhorse routines will be examined in turn.

c. sendDeletes Method

In an exemplary embodiment, the sendDeletes method may be constructed as follows.

```
 1:  int OutSynchronizer::sendDeletes( )
 2:  {
 3:      ASSERT(m_pStore != NULL || m_pTable != NULL);
 4:      ISyncJob*   pJob = m_pInfo != NULL ? m_pInfo-> job( ) : NULL;
 5:      IStatus* pStatus = m_pInfo != NULL ? m_pInfo->status( ) : NULL;
 6:      ITraceMgr* pTMgr = m_pInfo != NULL ? m_pInfo->tracer( ) : NULL;
 7:
 8:      IRecordMap& map = m_pStore->map( );
 9:
10:      // Iterate over the transaction table entries
11:      tTT::tIterator I, j;
12:      for (m_pTable->goHead(I); !m_pTable->atEnd(j = I); )
13:      {
14:          // abort if job has been cancelled
15:          if (pJob != NULL && pJob->cancel( ))
16:          {
17:              tsFORMAT0("********** SYNC CANCELLED BY USER **********");
18:              tsTRACE0(tTM::SYNCLOGIC, tTM::STD);
19:              break;
20:          }
21:
22:          m_pStats->m_delTrans++;
23:          m_pStats->m_delReject++;   // Assume rejection
24:
25:          // Iteration logic
26:          m_pTable->goNext(I);
27:          TransactionEntry& TE = m_pTable->current(j);
28:
29:          // Check if this entry participates in outbound synchronization
30:          if (TE.checkFlags(TransactionEntry::NO_EXPORT)) continue;
31:
32:          // Missing map entry?
33:          MapEntryExt* pMEE = map.moveToExt(TE.m_xID, TE.m_eID);
34:          if (pMEE == NULL)
35:          {
36:              // Just delete the transaction table entry.
37:              m_pTable->remove(j);
38:              continue;
39:          }
40:
41:          // Check if this record participates in outbound synchronization
42:          if (pMEE->checkFlags(IRecordMap::NO_EXPORT)) continue;
43:
44:          // Not marked deleted?
45:          if (!pMEE->checkFlags(IRecordMap::DELETED))
46:          {
47:              // Present in store?
48:              if (m_pStore->moveRecordToFromMap( )) continue;
49:
50:              // MIA, update the map
51:              updateMapForMissing(*pMEE, map, m_pTable->exportTime( ));
52:          }
53:
54:          // Send a delete order
55:          *m_pArch << PREFIX_DELETE_ORDER;
56:          pMEE->serialize(*m_pArch, pTMgr, tTM::ORDERS);
57:          if (m_pInSync != NULL && !synchronizeOne( )) return 0;
58:
```

```
59:         // Remove the entry from the EIT
60:         m_pTable->remove(j);
61:
62:         if (pStatus != NULL) pStatus->sendRecordMsg( ));
63:
64:         m_pStats->m_delReject--;
65:         m_pStats->m_delOrder++;
66:     }
67:
68:     *m_pArch << PREFIX_END_DELETES;
69:     if (m_pInSync != NULL && !synchronizeOne( )) return 0;
70:
71:     return 1;
72: }
```

After initial housekeeping steps (lines 3-6), the method creates an instance of the RecordMap, at line 8. Next, the method iterates over the transaction table (entries), which is the mechanism by which the system generates "deletes." As shown, a "for" loop is established at line 12, for iterating over the individual entries. At lines 14-20, the method aborts the iteration if the job has been canceled (e.g., synchronization canceled by the user). At lines 22-23, the method maintains statistics, by incrementing counter variables.

The actual iteration logic of the method begins at line 25. At line 30, the method checks whether the record (for the entry) is participating in outbound synchronization (i.e., whether the "NO_EXPORT" flag is set). At lines 32-39, the method tests whether the map entry (corresponding to the transaction table entry) is missing. If so, the method deletes the transaction table entry (line 37) and loops for the next record (line 48).

At lines 41-42, the method again checks whether the record is participating in outbound synchronization, this time by checking flags at the level of the RecordMap (as opposed to the transaction table entry, at line 30). If the record has not been marked for deletion (tested at line 45), the method confirms that the record is present in the store or repository (tested at line 48). If the record is not present, then a deletion has occurred. The RecordMap will be updated for the missing record, at line 51. If the record has passed all tests, then the method proceeds to line 54 to generate a delete order (i.e., stream the record into the SyncSet). The entry is removed from the transaction table (lines 59-60), a status message is generated (line 62), and statistics are updated (lines 64-65).

After the iteration has completed, the method proceeds to line 68. Here, the method marks the end of the deletes (in the SyncSet stream). In the event that the method is synchronizing one record at a time (tested at line 69), the method invokes a synchronizeOne method which proceeds to process the SyncSet. The method finally concludes at line 71.

d. extractRecords Method

An extractRecords method may, in an exemplary embodiment, be constructed as follows.

```
1:  int OutSynchronizer::extractRecords( )
2:  {
3:      ASSERT(m_pStore != NULL || m_pTable != NULL);
4:      ISyncJob*   pJob = m_pInfo != NULL ? m_pInfo->  job( ) : NULL;
5:      IStatus* pStatus = m_pInfo != NULL ? m_pInfo->status( ) : NULL;
6:      ITraceMgr* pTMgr = m_pInfo != NULL ? m_pInfo->tracer( ) : NULL;
7:
8:      IRecordMap& map = m_pStore->map( );
9:
10:         // Allow the store to optimize record iteration
11:     time_t lastExportTime = (!m_forceSync)
12:             ? m_pTable->lastExportTime( ).GetTime( ) : 0;
13:     if (!m_pStore->extractByDate(lastExportTime)) return 0;
14:
15:     // If there are no records, don't bother
16:     if (m_pStore->isEmpty( ))
17:     {
18:             *m_pArch << PREFIX_END_RECORDS;
19:             if (m_pInSync != NULL && !synchronizeOne( )) return 0;
20:             tsFORMAT0(_T("Empty store for
21:                 lastExportTime=%d"), lastExportTime);
22:             tsTRACE0(tTM::SYNCLOGIC, tTM::STD);
23:             return 1;
24:     }
25:
26:     // Tell the Store to send the schema
27:     *m_pArch << PREFIX_SCHEMA;
28:     m_pStore->sendSchema(*m_pArch);
29:     if (m_pInSync != NULL && !synchronizeOne( )) return 0;
30:
31:     for (m_pStore->moveRecordFirst( );
32:         !m_pStore->isEOF( ); m_pStore->moveRecordNext( ))
33:     {
34:             // abort if job has been cancelled
```

-continued

```
35:            if (pJob != NULL && pJob->cancel( ))
36:            {
37:                    tsFORMAT0("********** SYNC CANCELLED BY USER
**********");
38:                    tsTRACE0(tTM::SYNCLOGIC, tTM::STD);
39:                    break;
40:            }
41:
42:            m_pStats->m_recExtract++;
43:            m_pStats->m_recReject++; // Assume rejection
44:
45:            // See if the record has been exported or imported
46:            MapEntryExt* pMEE = m_pStore->moveEntryToFromStore( );
47:
48:            // See if the record is participating in outbound
synchronization
49:            if (pMEE != NULL && pMEE->checkFlags(IRecordMap::NO_EXPORT))
50:            {
51:                    tsFORMAT0(_T("Record %u-%u flagged NO_EXPORT in map"),
52:                        pMEE->m_xID, pMEE->m_eID);
53:                    tsTRACE0(tTM::SYNCLOGIC, tTM::STD);
54:                    continue;
55:            }
56:
57:            // Look up the record in the transaction table
58:            TransactionEntry* pTE =
59:                    (pMEE != NULL) ? m_pTable->lookup(pMEE->m_xID,
60:                    pMEE->m_eID) : NULL;
61:
62:            // Check if this entry participates in outbound synchronization
63:            if (pTE != NULL &&
pTE->checkFlags(TransactionEntry::NO_EXPORT))
64:            {
65:                    tsFORMAT0(_T("Record %u-%u flagged NO_EXPORT in table"),
66:                        pMEE->m_xID, pMEE->m_eID);
67:                    tsTRACE0(tTM::SYNCLOGIC, tTM::STD);
68:                    continue;
69:            }
70:
71:            // Outbound filtering goes here
72:            if (!m_pStore->filterForExport( ))
73:            {
74:                    tsFORMAT0(_T("Record failed outbound filtering"));
75:                    tsTRACE0(tTM::SYNCLOGIC, tTM::STD);
76:                    continue;
77:            }
78:
79:            // See if our map data needs to be updated or added
80:            time_t stamp = m_pStore->recordModifyTime( );
81:            if (pMEE != NULL) updateMapForExport(*pMEE, map, stamp);
82:            else pMEE = &m_pStore->addToMapForExport( );
83:
84:            // Transaction table logic
85:
86:            if (pTE !=NULL && !m_forceSync)
87:
88:                    // Do not export records just imported!
89:            time_t impStamp = pTE->m_impStamp.GetTime( );
90:                    if (stamp <= impStamp)
91:                    {
92:                            tsFORMAT0(_T("Record %u-%u stamp %d <=imp %d"),
93:                            pMEE->m_xID, pMEE->m_eID, stamp, impStamp);
94:                            tsTRACE0(tTM::SYNCLOGIC, tTM::STD);
95:                            continue;
96:                    }
97:
98:                    // Do not export records that haven't changed
99:            time_t expStamp = pTE->m_expStamp.GetTime( );
100:                   if (stamp <= expStamp)
101:                   {
102:                           tsFORMAT0(_T("Record %u-%u stamp %d <= exp %d"),
103:                           pMEE->m_xID, pMEE->m_eID, stamp, expStamp);
104:                           tsTRACE0(tTM::SYNCLOGIC, tTM::STD);
105:                           continue;
106:                   }
107:
108:                   tsFORMAT0(_T("Record %u-%u stamp %d > i/e %d/%d"),
109:                       pMEE->m_xID, pMEE->m_eID, stamp, impStamp, expStamp);
110:                   tsTRACE0(tTM::SYNCLOGIC, tTM::STD);
```

-continued

```
111:            }
112:
113:            // Run the gauntlet, export the record
114:            *m_pArch << PREFIX_EXPORT;
115:            pMEE->serialize(*m_pArch, pTMgr, tTM::EXPORTS);
116:            m_pStore->sendRecord(*m_pArch);
117:            if (m_pInSync != NULL && !synchronizeOne( )) return 0;
118:
119:            if (pTE != NULL)
120:            {
121:                    // Update transaction table entry
122:                    pTE->m_expTime = m_pTable->exportTime( );
123:                    pTE->m_expStamp = stamp;
124:            }
125:            else
126:            {
127:                    // Add transaction table entry.
128:                    pTE = &m_pTable->addForExport(pMEE->m_xID,
129:                  pMEE->m_eID, stamp);
130:            }
131:
132:            if (pStatus != NULL) pStatus->sendRecordMsg( );
133:
134:            m_pStats->m_recReject--;
135:            m_pStats->m_recExport++;
136:       }
137:
138:       *m_pArch << PREFIX_END_RECORDS;
139:       if (m_pInSync != NULL && !synchronizeOne( )) return 0;
140:
141:       return 1;
142:  }
```

The processing of this method is very similar to that presented for the sendDeletes method. After initial housekeeping (lines 3-6), the method obtains a RecordMap at line 8. Since this method will iterate over the store itself, the method allows the store to optimize record iteration at lines 10-13. In particular, the method communicates to the store that it should only process those records that have changed since the last synchronization. In a client/server scenario, this optimization can improve performance considerably.

At line 16, the method tests whether any records exist to process (i.e., determines whether the store is empty). If no records exist to process, the method will return at line 23. Otherwise, candidate records remain, and thus, the method tells the store to send the schema, at lines 26-28. Beginning at line 31, the method establishes a "for" loop for iterating over the store records (i.e., the optimized extracted set). As shown, the iteration cycle here is similar to that shown for the sendDeletes method. In this case, the system is going from the data set, to the RecordMap, and then to the transaction table. The lookup of the record in the transaction table occurs at lines 57-60. After the entry has been checked for determining whether it is participating in outbound synchronization, the method applies any outbound filtering at line 72, by invoking a filterForExport handler. At lines 79-82, the method makes sure that the map data is up-to-date, including preparing the data if needed.

The transaction table logic begins at line 84. As shown beginning at line 88, the method includes tests for determining whether an export record was just imported. To ensure system stability, the method does not export records which were just imported. Similarly, the method does not want to export any records which have not changed, as shown at lines 98-106. If the candidate record has passed all these tests, then the method proceeds to line 113 to export the record.

The actual steps to export the records are as follows. The method prefixes the export, as shown at line 114. Then, at line 115, the method serializes the actual record. If the InSynchronizer is directly connected, then the method will flush the record. Next, the transaction table is updated. Any existing transaction table entry is updated (lines 121-123). In the event that no such entry exists (the "else" statement beginning at line 125), a new transaction table entry is added, at lines 127-129. The iteration concludes by updating the status (message) at line 132, and updating statistics at lines 134-135. After the iteration, the method proceeds to line 138. Here, the "end of the records" (stream) is marked with a tag or prefix, as indicated at line 138. If the InSynchronizer is directly connected, the synchronizeOne handler is invoked at line 139. The method concludes at line 141 by returning true (i.e., the value of 1).

2. InSynchronizer a. Class Definition

The InSynchronizer, which provides complementary functionality, may be constructed as follows.

```
struct InSynchronizer
{
    enum EKeepArchive { YES, NO };
        InSynchronizer(CFile& file);
        ~InSynchronizer( );
        int open (ISyncInfo& outInfo, ISyncInfo& inInfo);
        int close(ISyncInfo& inInfo);
        int synchronize( );
        int synchronizeOne(EKeepArchive eKeep);
private:
        typedef TransactionTable tTT; // for brevity
        void init( );
        int remove( );
        int updateOrInsert( );
        int update(MapEntryExt& entryExt1, time_t& stamp);
        int insert(time_t& stamp);
        void updateMapForMissing(MapEntryExt& entryExt1,
            IRecordMap& map, const CTime& impTime);
```

-continued

```
          void updateMapForImport (MapEntryExt& entryExt1,
              IRecordMap& map, time_t modTime);
          void updateMapForDelete (MapEntryExt& entryExt1,
              const CTime& impTime);
          void updateMapForUpdate (MapEntryExt& entryExt1,
              time_t modTime);
          struct Stats;
          CFile&            m_file;
          CArchive*         m_pArch;
          ISyncInfo*        m_pInfo;
          StatusStr*        m_pSStr;
          MapEntryExt       m_MEE;
          tPrefix           m_prefix;
          BOOL              m_forceSync;
          IInserter*        m_pInserter;
          TransactionDB*    m_pTDB;
          tTT*              m_pTable;
          CTime             m_iLastTime;
          Stats*            m_pStats;
     };
```

As shown, the InSynchronizer includes a primary method: synchronize. It works in conjunction with two helper functions: remove and updateoOrInsert. The latter operates in conjunction with a specific update helper function and specific insert helper function. The class defines methods for maintaining the map. The class data members defined correspond largely to those described for the OutSynchronizer. The InSynchronizer employs a conduit to communicate with the "store." A pointer to IInserter data member is defined for providing access to this interface.

b. synchronize Method (for InSynchronizer)

The synchronize method for the InSynchronizer may be constructed as follows.

```
int InSynchronizer::synchronize( )
{
    int ok = 1;
    ISyncJob*   pJob = m_pInfo != NULL ? m_pInfo-> job( ) :
NULL;
    ITraceMgr* pTMgr = m_pInfo != NULL ? m_pInfo->tracer( ) :
NULL;
    do
    {
        // abort if job has been cancelled
        if (pJob != NULL && pJob->cancel( ))
        {
            tsFORMAT0("********** SYNC CANCELLED
BY USER **********")
            tsTRACE0(tTM::SYNCLOGIC, tTM::STD);
            return 0;
        }
        try { ok = synchronizeOne(YES); }
        catch (CArchiveException* pe)
        {
            if (pe->m_cause ==
            CArchiveException::endOfFile)
            {
                pe->Delete( );
                return 1;
            }
            pe->Delete( );
        }
    }
```

```
    while (ok && m_prefix != PREFIX_END_SYNC);
    return ok;
}
```

As shown, the method largely serves as a wrapper function for invoking the synchronizeOne method and catching any exceptions which occur.

c. synchronizeOne Method

The synchronizeOne method itself may be constructed as follows.

```
int InSynchronizer::synchronizeOne(EKeepArchive eKeep)
{
    IStatus* pStatus = m_pInfo
    != NULL ? m_pInfo->status( ) : NULL;
    ITraceMgr* pTMgr = m_pInfo
    != NULL ? m_pInfo->tracer( ) : NULL;
    if (m_pArch == NULL) m_pArch
    = new CArchive(&m_file, CArchive::load);
    int ok = 1;
    *m_pArch >> m_prefix;
    switch (m_prefix)
    {
    case PREFIX_DELETE_ORDER:
        m_MEE.serialize(*m_pArch, pTMgr, tTM::ORDERS);
        ok = remove( );
        break;
    case PREFIX_END_DELETES:
        break;
    case PREFIX_SCHEMA:
        m_pInserter->recvSchema(*m_pArch);
        break;
    case PREFIX_EXPORT:
        m_MEE.serialize(*m_pArch, pTMgr, tTM::EXPORTS);
        m_pInserter->recvRecard(*m_pArch);
        ok = updateOrInsert( );
        break;
    case PREFIX_END_RECORDS:
        break;
    case PREFIX_END_SYNC:
        break;
    default:
        ok = 0;
        S(pStatus, tISS::TS_ERROR, tsIN_SYNCSET);
    }
    if (eKeep == NO)
    {
        delete m_pArch;
        m_pArch = NULL;
        m_file.SeekToBegin( );
    }
    return ok;
}
```

As shown above, the core functionality of the method centers around a "switch" statement. The switch statement switches on the prefix tags present in the stream (and previously illustrated above). Based on the particular tag encountered, the method invokes a specific handler.

d. updateOrInsert Method

The updateOrInsert routine is one such handler. It may be constructed as follows.

```
1:   int InSynchronizer::updateOrInsert( )
2:   {
3:       ASSERT(m_pInserter == NULL || m_pTable != NULL);
```

-continued

```
 4:        ITraceMgr* pTMgr = m_pInfo != NULL
 5:              ? m_pInfo->tracer( ) : NULL;
 6:
 7:        IStore& store = m_pInserter->store( );
 8:        IRecordMap& map = store.map( );
 9:
10:        m_pStats->m_recExport++;
11:        m_pStats->m_recReject++; // Assume rejection
12:
13:        // Entry in map?
14:        MapEntryExt* pMEE = map.moveToExt(m_MEE.m_xID,
15:              m_MEE.m_eID);
16:        if (pMEE != NULL)
17:        {
18:              // Off limits?
19:              if (pMEE->checkFlags(IRecordMap::NO_IMPORT
20:                | IRecordMap::DELETED))
21:              {
22:                    tsFORMAT0(_T("Record %u-%u flagged NO_IMPORT
23:                      | DELETED in map"), pMEE->m_xTD, pMEE->m_eID);
24:                    tsTRACE0(tTM::SYNCLOGIC, tTM::STD);
25:                    return 1;
26:              }
27:
28:              // Look up the record in the transaction table
29:              tTT::tIterator I;
30:              TransactionEntry* pTE
31:                = m_pTable->lookup(m_MEE.m_xID, m_MEE.m_eID, I);
32:
33:              // Deleted by user?
34:              if ( ! store.moveRecordToFromMap( ))
35:              {
36:                    // Update map, remove table entry and bail
37:                    updateMapForMissing(*pMEE, map,
38:                      m_pTable->importTime( ));
39:                    if (pTE != NULL) m_pTable->remove(I);
40:
41:                    tsFORMAT0(_T("Record %u-%u deleted by user"),
42:                      pMEE->m_xID, pMEE->m_eID);
43:                    tsTRACE0(tTM::SYNCLOGIC, tTM::STD);
44:                    return 1;
45:              }
46:
47:              // See if our map data needs to be updated
48:              updateMapForImport(*pMEE, map, store.recordModifyTime( ));
49:
50:              // If the record has been updated after
51:        // the export was originally modified, bail
52:              if ( ! m_forceSync && pMEE->m_mTime >= m_MEE.m_mTime)
53:              {
54:                    tsFORMAT0(_T("Record %u-%u stamp %d >= org %d"),
55:                      pMEE->m_xID, pMEE->m_eID, pMEE->m_mTime, m_MEE.m_mTime);
56:                    tsTRACE0(tTM::SYNCLOGIC, tTM::STD);
57:                    return 1;
58:              }
59:
60:              // Check to see if this record is participating
61:              // in inbound synchronization
62:              if (pTE != NULL &&
pTE->checkFlags(TransactionEntry::NO_IMPORT))
63:              {
64:                    tsFORMAT0(_T("Record %u-%u flagged NO_IMPORT in table"),
65:                      pMEE->m_xID, pMEE->m_eID);
66:                    tsTRACE0(tTM::SYNCLOGIC, tTM::STD);
67:                    return 1;
68:              }
69:
70:              // Now do the update
71:              time_t stamp = 0;
72:              if (!update(*pMEE, stamp)) return 0;
73:              if (stamp == 0) return 1; // Not a failure, but no update
74:
75:              // Create table entry if necessary
76:              if (pTE == NULL)
77:              {
78:                    pTE = &m_pTable->addForImport(m_MEE.m_xID,
79:                      m_MEE.m_eID, stamp);
80:              }
81:
```

```
82:              // Otherwise, update the transaction table entry
83:              else
84:              {
85:                      pTE->m_impTime  = m_pTable->importTime( );
86:                      pTE->m_impStamp = stamp;
87:              }
88:
89:              tsFORMAT0(_T("Record %u-%u stamp %d updated"),
90:                 pMEE->m_xID, pMEE->m_eID, stamp);
91:              tsTRACE0(tTM::SYNCLOGIC, tTM::STD);
92:          }
93:          // No entry in map
94:          else
95:          {
96:              // Look up the record in the transaction table
97:              tTT::tIterator I;
98:              TransactionEntry* pTE = m_pTable->lookup(m_MEE.m_xID,
99:                 m_MEE.m_eID, I);
100:
101:             // Delete it, if exists (pathological case)
102:             if (pTE != NULL) m_pTable->remove(I);
103:
104:             // Now do the insert
105:             time_t stamp = 0;
106:             if (!insert(stamp)) return 0;
107:             if (stamp == 0) return 1; // Not a failure, but no insert
108:
109:             // Add a new transaction table entry
110:             pTE = &m_pTable->addForImport(m_MEE.m_xID, m_MEE.m_eID, stamp);
111:
112:             tsFORMAT0(_T("Record %u-%u stamp %d inserted"), m_MEE.m_xID,
113:                 m_MEE.m_eID, stamp);
114:             tsTRACE0(tTM::SYNCLOGIC, tTM::STD);
115:         }
116:
117:      return 1;
118:  }
```

After initial housekeeping steps (lines 3-5), the method connects to the "store" (interface) and instantiates a RecordMap. At line 13, the method determines whether an entry exists in the RecordMap. If so, the method also tests whether the record is flagged (in the record map) as "NO_IMPORT" or "DELETED", tested at lines 18-26. If either of these conditions hold true, the method terminates at line 25.

Next, the method looks up the record in the transaction table at line 28. Now, at line 34, the method can test whether the record has been deleted by the user. If needed, the map data is updated at line 38. At line 52, the method tests whether the record has been updated after the export was originally modified. If so, the method terminates (at line 57). At line 62, the method checks whether the record is participating in inbound synchronization. In such a case, the record is flagged "NO_IMPORT." If this flag is detected, the method terminates (at line 67).

Having made it to line 70, the method is now ready to do the actual update. In particular, the update workhorse routine is invoked at line 72. In the event that the update call fails, the method terminates (at line 73). Proceeding to line 75, the method creates an entry in the transaction table for the record in the instance that a record does not already exist. Otherwise, if a record already exists, the transaction table entry is updated (lines 85-86).

The "else" statement beginning at line 94 addresses the scenario where no entry exists in the record map. Here, the method proceeds as follows. At line 96, the method looks up the record in the transaction table and, at line 102, deletes it if it exists. Now, at lines 105-107, the method can proceed to perform the insert. As before, a transaction table entry is created; this is shown at line 110. After final cleanup, the method may return "success" or "true," at line 117.

e. update Method

Exemplary implementation of the update method is as follows.

```
int InSynchronizer::update(MapEntryExt& MEE, time_t& stamp)
{
    ASSERT(m_pInserter == NULL || m_pTable != NULL);
    IStatus* pStatus = m_pInfo
         != NULL ? m_pInfo->status( ) : NULL;
    ITraceMgr* pTMgr = m_pInfo
         != NULL ? m_pInfo->tracer( ) : NULL;
    // Fetch the target record's field data
         // and perform the transformation
    m_pInserter->fetchTgtFields( );
    m_pInserter->transformFields( );
    // Apply inbound filtering here
    if (!m_pInserter->filterForUpdate( ))
    {
         tsFORMAT0(_T("Record failed inbound filtering"));
         tsTRACE0(tTM::SYNCLOGIC, tTM::STD);
         return 1;
    }
    // Update record with the field data and map entry
    if (!m_pInserter->updateRecord(stamp))
    {
         S(pStatus, tISS::TS_ERROR, tsSTR_BADUPDATE);
         return 0;
    }
    updateMapForUpdate(MEE, stamp);
```

-continued

```
        if (pStatus != NULL) pStatus->sendRecordMsg( );
        m__pStats->m__recReject--;
        m__pStats->m__recImport++;
        return 1;
}
```

In particular, the routine includes a call to fetch the target record's actual field data (by invoking such TgtFields) and, thereafter, transforming the fields as needed by invoking transformFields. This is followed by the method performing any inbound filtering. The target record is updated with the field data (by invoking updateRecord), and the corresponding record map is also updated.

f. insert Method

The insert method, which functions in a similar manner, may be implemented as follows.

```
int InSynchronizer::insert(time__t& stamp)
{
        ASSERT(m__pInserter == NULL || m__pTable != NULL);
        IStatus* pStatus = m__pInfo
                != NULL ? m__pInfo->status( ) : NULL;
        ITraceMgr* pTMgr = m__pInfo
                != NULL ? m__pInfo->tracer( ) : NULL;
        // Fetch the record's field default data
        // and perform the transformation
        m__pInserter->fetchDefFields ( );
        m__pInserter->transformFields ( );
        // Apply inbound filtering here
        if (!m__pInserter->filterForInsert( ))
        {
                tsFORMAT0(__T("Record failed inbound filtering"));
                tsTRACE0(tTM::SYNCLOGIC, tTM::STD);
                return 1;
        }
        // Add record with field data and map entry
        if (!m__pInserter->insertRecord(stamp))
        {
                S(pStatus, tISS::TS__ERROR, tsSTR__BADINSERT);
                return 0;
        }
        m__pInserter->store( ).addToMapForImport(m__MEE, stamp);
        if (pStatus != NULL) pStatus->sendRecordMsg( );
        m__pStats->m__recReject--;
        m__pStats->m__recInsert++;
        return 1;
}
```

Again, the method fetches the records for data and applies any necessary field transformation. Thereafter, inbound filtering is applied and the record is inserted. The map data is updated to add a map entry for the record.

Attached herewith as Appendix A is a Developer's Guide providing further description of the present invention.

While the invention is described in some detail with specific reference to a single-preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. A method comprising:
   receiving a request specifying synchronization of information records of a source dataset residing on a first device with information records of a target dataset residing on a second device;
   determining a synchronization set by:
      (i) determining which, if any, information records have been previously transmitted to the target dataset but no longer exists at the source dataset, and
      (ii) determining which, if any, information records have been added to or modified at the source dataset since the source dataset was last synchronized with the target dataset,
   wherein each information record of the source dataset is assigned a globally unique identifier that is independent of either of the devices, for identifying said each information record at both the source dataset and the target dataset, said globally unique identifier being maintained in a device-independent record map that allows the globally unique identifier to be traced back to a specific information record regardless of whether the specific information record resides on the first or second device; and
   based on said synchronization set, synchronizing information records of the source dataset with information records of the target dataset by:
      (i) using said globally unique identifiers to delete from the target dataset any information records which have been previously transmitted to the target dataset but no longer exist at the source dataset, and
      (ii) using said globally unique identifiers to update the target dataset so that said target dataset includes those information records determined to have been added to or modified at the source dataset since the source dataset was last synchronized with the target dataset,
   wherein each of the globally unique identifiers comprises a non-modifiable hidden field containing a record identifier which is maintained throughout the existence of a corresponding information record.

2. The method of claim 1, wherein each dataset comprises a database table having a plurality of data records.

3. The method of claim 1, wherein each dataset comprises an electronic address book listing contact information.

4. The method of claim 1, wherein each dataset comprises an electronic schedule listing scheduling information.

5. The method of claim 1, wherein said globally unique identifiers are created by the system regardless of whether the source dataset includes existing record identifiers.

6. The method of claim 5, wherein said globally unique identifiers are maintained in a record map stored apart from the source dataset.

7. The method of claim 1, wherein each said globally unique identifier for each record comprises a timestamp which is assigned to the record when the record is initially processed by the system.

8. The method of claim 1, wherein each globally unique identifier is a 32-bit value.

9. The method of claim 1, further comprising:
   synchronizing the information records of the target dataset with information records of the source dataset by designating the source dataset as the target dataset, designating the target dataset as the source dataset, and repeating said determining step and said synchronizing step.

10. The method of claim 1, wherein said synchronization set comprises a delete order specifying particular information records to delete at the target dataset.

11. The method of claim 10, wherein said delete order includes a list of globally unique identifiers for particular information records to delete at the target dataset.

12. The method of claim 1, wherein said synchronization set comprises an extraction record specifying particular information to add to or modify at the target dataset.

13. The method of claim 12, wherein said extraction record includes at least one globally unique identifier together with field information for the particular information to add to or modify at the target dataset.

14. The method of claim 1, further comprising:
excluding certain information records from participating in synchronization by applying a user-defined filter.

15. The method of claim 14, wherein said user-defined filter comprises an outbound filter applied to information records prior to creation of the synchronization set.

16. The method of claim 14, wherein said user-defined filter comprises an inbound filter applied to information records after creation of the synchronization set.

17. The method of claim 14, wherein said user-defined filter comprises a user-supplied filtering routine supplying filtering logic.

18. The method of claim 1, wherein said target dataset resides at a remote location relative to the source dataset.

19. The method of claim 18, further comprising:
after creating the synchronization set, transmitting said synchronization set to said remote location.

20. The method of claim 19, wherein the synchronization set is transmitted to the remote location using an electronic messaging communication protocol.

21. The method of claim 1, wherein the synchronization set comprises an envelope, a content header and a content body.

22. The method of claim 1, wherein said synchronizing comprises transforming one or more of said information records that are in a format used by a first application to other information records that are in a format used by a second application which is different from the first application.

23. A system comprising:
means for connecting a first device having a first dataset to a second device having a second dataset;
means for determining information of said first and second datasets which requires synchronization, said means including:
(i) means for determining for each dataset information which has been previously received from the other dataset but which no longer exists at the other dataset, and
(ii) means for determining for each dataset information which has been added or modified at the other dataset since the other dataset was last synchronized with said each dataset; and
means, responsive to said determining means, for synchronizing said first and second datasets,
wherein said information of said first and second datasets comprises data records and wherein said means for determining include means for assigning to each data record a device-independent globally unique identifier created by the system for uniquely identifying each data record regardless of which dataset and device the data record resides, and
wherein each of the globally unique identifiers comprise a non-modifiable hidden field containing a record identifier which is maintained throughout the existence of a corresponding data record.

24. The system of claim 23, wherein at least one of said devices is a hand-held computing device.

25. The system of claim 23, wherein at least one of said devices is desktop computing device.

26. The system of claim 23, wherein said means for connecting includes a Transmission Control Protocol/Internet Protocol (TCP/IP) connection.

27. The system of claim 23, wherein said means for synchronizing operates to provide bi-directional synchronization of the datasets.

28. The system of claim 23, further comprising:
filter means for selectively blocking synchronization of certain types of information.

29. The system of claim 28, wherein said filter means operates based on how old information is.

30. The system of claim 28, wherein said filter means operates based on particular information content.

31. The system of claim 23, further comprising:
electronic mail transport means for enabling synchronization of remote datasets.

32. The system of claim 23, wherein said means for synchronizing transforms one or more of the data records that are in a format used by a first application to other data records that are in a format used by a second application which is different from the first application, during synchronization.

33. An apparatus comprising a processor configured to:
receive a request specifying synchronization of information records of a source dataset residing on the apparatus with information records of a target dataset residing on a second apparatus;
determine a synchronization set by:
(i) determining which, if any, information records have been previously transmitted to the target dataset but no longer exists at the source dataset, and
(ii) determining which, if any, information records have been added to or modified at the source dataset since the source dataset was last synchronized with the target dataset;
assign each information record of the source dataset a globally unique identifier that is independent of the first and second devices, for identifying said each information record at both the source dataset and the target dataset, said globally unique identifier being maintained in a device-independent record map that allows the globally unique identifier to be traced back to a specific information record regardless of whether the specific information record resides on the first or second device;
utilize the synchronization set to synchronize information records of the source dataset with information records of the target dataset by:
(i) using said globally unique identifiers to delete from the target dataset any information records which have been previously transmitted to the target dataset but no longer exist at the source dataset, and
(ii) using said globally unique identifiers to update the target dataset so that said target dataset includes those information records determined to have been added to or modified at the source dataset since the source dataset was last synchronized with the target dataset,
wherein each of the globally unique identifiers comprise a non-modifiable hidden field containing a record identifier which is maintained throughout the existence of a corresponding information record.

34. The apparatus of claim 33, wherein the processor is further configured to transform one or more of said information records that are in a format used by a first application to other information records that are in a format used by a second application which is different from the first application.

35. The apparatus of claim 33, wherein the processor is further configured to exclude certain information records from participating in synchronization by applying a user-defined filter comprising an outbound filter applied to information records prior to creation of the synchronization set.

36. A computer program product comprising at least one computer-readable storage medium having computer-readable program code portions stored therein, the computer-readable program code portions comprising:
- a first executable portion for receiving a request specifying synchronization of information records of a source dataset residing on a first device with information records of a target dataset residing on a second device;
- a second executable portion for determining a synchronization set by:
  (i) determining which, if any, information records have been previously transmitted to the target dataset but no longer exists at the source dataset, and
  (ii) determining which, if any, information records have been added to or modified at the source dataset since the source dataset was last synchronized with the target dataset;
- a third executable portion for assigning each information record of the source dataset a globally unique identifier that is independent of the first and second devices, for identifying each information record at both the source dataset and the target dataset, said globally unique identifier being maintained in a device-independent record map that allows the globally unique identifier to be traced back to a specific information record regardless of whether the specific information record resides on the first or second device; and
- a fourth executable portion for synchronizing information records of the source dataset with information records of the target dataset, based on said synchronization set, by:
  (i) using said globally unique identifiers to delete from the target dataset any information records which have been previously transmitted to the target dataset but no longer exist at the source dataset, and
  (ii) using said globally unique identifiers to update the target dataset so that said target dataset includes those information records determined to have been added to or modified at the source dataset since the source dataset was last synchronized with the target dataset,
  wherein each of the globally unique identifiers comprises a non-modifiable hidden field containing a record identifier which is maintained throughout the existence of a corresponding information record.

37. The computer program product of claim 36, wherein the fourth executable portion transforms one or more of said information records that are in a format used by a first application to other information records that are in a format used by a second application which is different from the first application.

38. The computer program product of claim 36, further comprising a fifth executable portion for excluding certain information records from participating in synchronization by applying a user-defined filter comprising an outbound filter applied to information records prior to creation of the synchronization set.

* * * * *